United States Patent
Dille et al.

(10) Patent No.: US 11,306,835 B1
(45) Date of Patent: Apr. 19, 2022

(54) FLAPPER VALVES WITH HYDROFOIL AND VALVE SYSTEMS

(71) Applicant: KHOLLE Magnolia 2015, LLC, Houston, TX (US)

(72) Inventors: Mark C. Dille, Magnolia, TX (US); Larry Mitchell Hill, Cypress, TX (US); William Brent Stroebel, Houston, TX (US); Scott Taylor Donaldson, Spring, TX (US); E. Lee Colley, III, Houston, TX (US)

(73) Assignee: KHOLLE Magnolia 2015, LLC, Tomball, TX (US)

( * ) Notice: Subject to any disclaimer, the term of this patent is extended or adjusted under 35 U.S.C. 154(b) by 199 days.

(21) Appl. No.: 16/443,730

(22) Filed: Jun. 17, 2019

(51) Int. Cl.
*F16K 15/03* (2006.01)
*G05D 7/01* (2006.01)
*E21B 43/26* (2006.01)

(52) U.S. Cl.
CPC ......... *F16K 15/035* (2013.01); *G05D 7/0173* (2013.01); *E21B 43/26* (2013.01)

(58) Field of Classification Search
CPC ...... F16K 15/035; E21B 43/26; G05D 7/0173
See application file for complete search history.

(56) References Cited

U.S. PATENT DOCUMENTS

| | | | |
|---|---|---|---|
| 362,651 A | 5/1887 | Neary | |
| 1,325,568 A | 12/1919 | Leidecker | |
| 2,756,017 A | * 7/1956 | Silverman | ............... F16K 15/03 251/148 |
| 2,928,416 A | 3/1960 | Ballhouse | |
| 3,053,278 A | * 9/1962 | Verheul | ................. E21B 21/106 137/614.21 |
| 3,060,961 A | 10/1962 | Conley | |
| 3,119,594 A | 1/1964 | Heggem | |
| 3,144,045 A | * 8/1964 | Fitzpatrick | ............. F16K 15/03 137/527.8 |
| 4,054,153 A | 10/1977 | Guyton | |
| 4,508,139 A | 4/1985 | Teumer | |
| 4,907,650 A | 3/1990 | Heinonen | |
| 5,497,802 A | 3/1996 | Whiteside | |
| 5,564,502 A | 10/1996 | Crow et al. | |
| 5,713,389 A | 2/1998 | Wilson, Jr. et al. | |
| 6,125,878 A | 10/2000 | Watts | |

(Continued)

FOREIGN PATENT DOCUMENTS

GB 811237 4/1958
WO 01/31167 A1 5/2001

(Continued)

OTHER PUBLICATIONS

FMC Technologies, *Flowline Products and Services—World Proven Chiksan® and Weco® Equipment* (undated).

(Continued)

*Primary Examiner* — Patrick C Williams
(74) *Attorney, Agent, or Firm* — Keith B. Willhelm

(57) ABSTRACT

Pivot valves have a valve seat and a valve closure mounted for pivoting movement through a closure chamber in a passage. The pivot valves may be selectively set in a check mode and an open mode. Flapper valves have a hydrofoil extending from a flapper. Valve assemblies comprise the pivot valves and flapper valves and have an open condition, a check condition, and a shut-off condition.

12 Claims, 14 Drawing Sheets

(56) References Cited

U.S. PATENT DOCUMENTS

| | | | |
|---|---|---|---|
| 6,196,261 | B1 | 3/2001 | Dennistoun |
| 6,543,474 | B2 | 4/2003 | Fetterman |
| 7,726,418 | B2 | 6/2010 | Ayling |
| 10,295,071 | B2 | 5/2019 | Nguyen |
| 2010/0155143 | A1 | 6/2010 | Braddick |
| 2013/0000745 | A1 | 1/2013 | Witkowski et al. |
| 2014/0261789 | A1 | 9/2014 | Hull |
| 2014/0332277 | A1 | 11/2014 | Churchill |
| 2015/0276245 | A1 | 10/2015 | Walters et al. |
| 2017/0067327 | A1 | 3/2017 | Harris et al. |
| 2017/0275980 | A1* | 9/2017 | Kajaria ............ F16L 55/07 |
| 2018/0238459 | A1* | 8/2018 | Nowell ............ F16K 15/03 |
| 2018/0347286 | A1* | 12/2018 | Scott ............ E21B 17/05 |
| 2020/0123876 | A1 | 4/2020 | Cannon et al. |

FOREIGN PATENT DOCUMENTS

| | | |
|---|---|---|
| WO | 2016/147200 A1 | 9/2016 |
| WO | 2017/031449 A1 | 2/2017 |

OTHER PUBLICATIONS

FMC Technologies, *Weco® 3" 15K Top Entry Check Valve* (Copyright 2016).

MIFAB, *BV1000 Cast Iron Backwater Valve with PVC Flapper* (Feb. 22, 2017).

Phoinix Global, Dwg. No. CVA3-3DRM-S01 (Nov. 4, 2011).

Tech-Seal International, *Flapper Check Valve Operation and Maintenance Manual* (Apr. 22, 2015).

Weir Oil & Gas. *SPM® Well Service Pumps & Flow Control Products* (Copyright 2014).

WEIR, *SPM® Flow Control Products Catalog* (May 4, 2015).

Aardvark Packers, *The Stats on Fracking: The Real Numbers of Hydraulic Fracturing*.

Manfreda, J., *The Real History of Fracking: Oil, Bombs and Civil War*, oilprice.com (Oct. 9, 2019).

Montgomery, C. T., et al., *Hydraulic Fracturing History of an Enduring Technology*, Journal of Petroleum Technology 26, at 27 (Dec. 2010).

Morton, M., *Unlocking the Earth—A Short History of Hydraulic Fracturing*, GEO ExPro, vol. 10, No. 6 (2013).

\* cited by examiner

1

FLAPPER VALVES WITH HYDROFOIL AND VALVE SYSTEMS

FIELD OF THE INVENTION

The present invention relates generally to fluid transportation systems and flow lines and components used in those systems, and especially to valves, valve systems, and zipper manifolds used to convey abrasive, corrosive fluids tinder high pressure as are common, for example, in the oil and gas industry.

BACKGROUND OF THE INVENTION

Hydrocarbons, such as oil and gas, may be recovered from various types of subsurface geological formations. The formations typically consist of a porous layer, such as limestone and sands, overlaid by a nonporous layer. Hydrocarbons cannot rise through the nonporous layer. Thus, the porous layer forms a reservoir, that is, a volume in which hydrocarbons accumulate. A well is drilled through the earth until the hydrocarbon bearing formation is reached. Hydrocarbons then can flow from the porous formation into the well.

In what is perhaps the most basic form of rotary drilling methods, a drill bit is attached to a series of pipe sections or "joints" referred to as a drill string. The drill string is suspended from a derrick and rotated by a motor in the derrick. A drilling fluid or "mud" is pumped down the drill string, through the bit, and into the bore of the well. This fluid serves to lubricate the bit. The drilling mud also carries cuttings from the drilling process back to the surface as it travels up the wellbore. As the drilling progresses downward, the drill string is extended by adding more joints of pipe.

When the drill bit has reached the desired depth, larger diameter pipes, or casing, are placed in the well and cemented in place to prevent the sides of the borehole from caving in. The well may be extended by drilling additional sections and installing large, but somewhat smaller pipes, or liners. The liners also are typically cemented in the bore. The liner may include valves, or it may then be perforated. In either event, openings in the liner are created through which oil can enter the cased well. Production tubing, valves, and other equipment are installed in the well so that the hydrocarbons may flow in a controlled manner from the formation, into the lined well bore, and through the production tubing up to the surface for storage or transport.

Hydrocarbons, however, are not always able to flow easily from a formation to a well. Some subsurface formations, such as sandstone, are very porous. Hydrocarbons can flow easily from the formation into a well. Other formations, however, such as shale rock, limestone, and coal beds, are only minimally porous. The formation may contain large quantities of hydrocarbons, but production through a conventional well may not be commercially practical because hydrocarbons flow though the formation and collect in the well at very low rates. The industry, therefore, relies on various techniques for improving the well and stimulating production from formations. In particular, various techniques are available for increasing production from formations which are relatively nonporous.

Perhaps the most important stimulation technique is the combination of horizontal wellbores and hydraulic fracturing. A well will be drilled vertically until it approaches a formation. It then will be diverted, and drilled in a more or less horizontal direction, so that the borehole extends along the formation instead of passing through it. More of the formation is exposed to the borehole, and the average distance hydrocarbons must flow to reach the well is decreased. Fractures then are created in the formation which will allow hydrocarbons to flow more easily from the formation.

Fracturing a formation is accomplished by pumping fluid, most commonly water, into the well at high pressure and flow rates. Proppants, such as grains of sand, ceramic or other particulates, usually are added to the fluid along with gelling agents to create a slurry. The slurry is forced into the formation at rates faster than can be accepted by the existing pores, fractures, faults, vugs, caverns, or other spaces within the formation. Pressure builds rapidly to the point where the formation fails and begins to fracture. Continued pumping of fluid into the formation will tend to cause the initial fractures to widen and extend further away from the wellbore, creating flow paths to the well. The proppant serves to prevent fractures from closing when pumping is stopped.

A formation rarely will be fractured all at once. It typically will be fractured in many different locations or zones and in many different stages. Fluids will be pumped into the well to fracture the formation in a first zone. Typically, the first zone will be at the bottom or "toe" of the well. After the initial zone is fractured, pumping is stopped, and a plug is installed or otherwise established in the liner at a point above the fractured zone. Pumping is resumed, and fluids are pumped into the well to fracture the formation in a second zone located above the plug. That process is repeated for zones further up the formation until the formation has been completely fractured.

Once the well is fractured, large quantities of water and sand that were injected into the formation eventually must be allowed to flow out of the well. The water and sand will be separated from hydrocarbons produced by the well to protect downstream equipment from damage and corrosion. The production stream also may require additional processing to neutralize corrosive agents in the stream.

Systems for successfully completing a fracturing operation, therefore, are extensive and complex, as may be appreciated from FIG. 1. FIG. 1 illustrates schematically a conventional frac system. Water from tanks 1 and gelling agents dispensed by a chemical unit 2 are mixed in a hydration unit 3. The discharge from hydration unit 3, along with sand carried on conveyors 4 from sand tanks 5 is fed into a blending unit 6. Blender 6 mixes the gelled water and sand into a slurry. The slurry is discharged through low-pressure hoses 7 which convey it into two or more low-pressure lines 8 in a frac manifold 9. The low-pressure lines 8 in frac manifold 9 feed the slurry to an array of pumps 10, perhaps as many as a dozen or more, through low-pressure "suction" hoses 11.

Pumps 10 take the slurry and discharge it at high pressure through individual high-pressure "discharge" lines 12 into a "missile" 13 on frac manifold 9. The combined flow from pump discharge lines 12 flows through missile 13 into a high-pressure line 14 running to a junction head 15 of a "zipper" manifold 16 (also referred to by some as a "frac manifold"). Zipper manifold 16 includes flow lines 17 running to, for example, two well heads 19 that control flow into and out of their respective wells. Valves 18 are provided in zipper flow lines 17 so that the frac slurry may be selectively diverted to one of the well heads 19. Once fracturing is complete, flow back from the fracturing operation discharges into a flowback manifold 20 which leads into flowback tanks 21. Valves 18 then will be operated to divert frac fluid into the other well head 19 to frac that well.

Frac systems are viewed as having "low-pressure" and "high-pressure" sides or, more simply, as having low sides and high sides. The low side includes the components upstream of the inlet of pumps 10, e.g., water tanks 1, hydration unit 3, blending unit 6, and the low-pressure lines 8 of frac manifold 9, which operate under relatively low pressures. The conduits on the low-pressure side typically will be flexible hoses, such as blender hoses 7 and suction hoses 11.

The high side includes all the components downstream of the discharge outlets of pumps 10, e.g., the high-pressure missiles 13 of frac manifold 9 and flow lines 14 running to junction head 15, which operate under relatively high pressures. The conduits in the high-pressure side of frac systems typically are assembled on site, although some subsystems are pre-assembled on a skid, trailer, or truck, such as frac manifold 9 and zipper manifold 16.

The components used to assemble the high side of frac systems are generally referred to as "frac iron," "flow iron," or "ground iron." They include sections of straight steel pipe, such as pup joints. They also include various fittings, such as tees, crosses, laterals, and wyes, which provide junctions at which flow is split or combined. In addition to junction fittings, flowline components include fittings which are used to alter the course of a flow line. Such directional fittings include elbows and swivel joints. High-pressure flow lines also incorporate gauges and other monitoring equipment, as well as control devices such as shut-off, plug, check, throttle, pressure release, butterfly, and choke valves.

High side components must be extremely rugged. They are required to endure extremely abrasive frac slurries flowing at extremely high pressures and rates. Not only is the slurry abrasive, but it often is corrosive as well. It can rapidly erode and weaken conduit walls. Flow through relatively long straight sections of pipe is relatively laminar. Flow through other areas, however, may be quite turbulent. Erosion is a more significant issue where a flow line changes direction, and the high-pressure side of typical frac systems may have numerous, relatively sharp turns. Flow will more directly impact conduit walls, causing more abrasion than that caused simply by fluid passing over the walls.

The high pressures and flow rates typically will create vibration in the system. The vibration can be profound. It tends to create bending stress that can exacerbate leakage, especially at unions. The effects of accumulated stress over time also can accelerate corrosion and erosion of flowline components and cause damage or weakening which is difficult to detect, such as fatigue stress and microscopic fracturing. Thus, the components must be certified and periodically recertified as complying with rated specifications. The initial cost of many flow iron components already is quite high, and the cost of repeatedly recertifying or replacing components can add significantly to operating costs of the system.

Frac jobs also have become more extensive, both in terms of the pressures required to fracture a formation and the time required to complete all stages of an operation. Prior to horizontal drilling, a typical vertical well might require fracturing in only one, two or three zones at pressures usually well below 10,000 psi. Fracturing a horizontal well, however, may require fracturing in 20 or more zones. Horizontal wells in shale formations such as the Eagle Ford shale in South Texas typically require fracturing pressures of at least 9,000 psi and 6 to 8 hours or more of pumping. Horizontal wells in the Haynesville shale in northeast Texas and northwest Louisiana require pressures around 13,500 psi. Pumping may continue near continuously—at flow rates of 2 to 3 thousand gallons per minute (gpm)—for several days before fracturing is complete.

Zipper manifolds are an area of particular concern. Zipper manifolds typically incorporate multiple elbow and tee fittings. Such fittings direct flow through 90° turns and are particularly susceptible to erosion and corrosion. Zipper valves also incorporate valves to selectively distribute flow into multiple well heads. Zipper manifold 16, for example, incorporates valves 18 that may be opened and shut to selectively divert fluid to two well heads 19. In conventional zipper manifolds those valves are almost universally gate valves or, as they are sometimes called, sluice valves. If not in the zipper manifold, conventional systems also typically incorporate check valves, most commonly flapper valves, to check back flow through the system during fracturing operations.

While there are several variations on the basic design, all gate valves incorporate a gate that can be raised and lowered. The gate typically is disc or rectangular shaped plate. When raised, the gate retracts above the valve passage, thus allowing full flow through the valve. There is very little restriction of flow, and pressure drop through the valve is effectively minimized. When the gate is lowered, the gate extends completely across the passage and engages seats extending around the periphery of the passage. Though poorly suited to regulating flow, gate valves can effectively shut off flow through a line. Gate valves also tend to be less expensive that other types of conventional shut-off valves, such as ball valves.

Gate valves, however, have various attendant problems. It often takes some time to operate the valve and shut off flow. Manual gate valves, for example, raise and lower the gate by rotating a wheel that is coupled to a threaded stem connected in turn to the gate. Because they tend to stay in either their open or shut positions for extended periods of time, gates also can seize, especially in the shut position. The valves must be greased regularly to minimize such problems and to allow the gate to move easily and to seat effectively. Grease used to lubricate gate valves, however, can be blown into the well where it can interfere with the operation of downhole tools. For example, grease pushed into a liner can cause plugs to lose their grip on liner walls, allowing them to be displaced by flow in the liner.

Finally, both the face of the gate and the seat must be relatively clean, or the gate will not seat properly and completely shut off flow. The seat, however, extends around the inner diameter of the passage. The gate must drop into a groove in order to seal against the seat. That groove can easily become loaded with sand and other proppants suspended in frac fluids. It must be flushed and cleaned regularly to avoid leakage through the valve.

The statements in this section are intended to provide background information related to the invention disclosed and claimed herein. Such information may or may not constitute prior art. It will be appreciated from the foregoing, however, that there remains a need for new and improved components used frac systems and other high-pressure fluid transportation systems, especially for new and improved valves, valve systems, and zipper manifolds. Likewise, there is a need for new and improved methods of assembling such flow lines and systems. Such disadvantages and others inherent in the prior art are addressed by various aspects and embodiments of the subject invention.

SUMMARY OF THE INVENTION

The subject invention, in its various aspects and embodiments, relates generally to fluid transportation systems and flow lines used in those systems and especially to valves, valve systems, and zipper manifolds. It encompasses various embodiments and aspects, some of which are specifically described and illustrated herein. One broad embodiment provides for a pivot valve for a flow line, especially a high-pressure flowline. The pivot valve comprises a valve housing adapted for assembly into the flow line. The housing has a passage providing a valve inlet and a valve outlet. A valve seat is in the passage. A valve closure is mounted for pivoting movement through a closure chamber in the passage. The valve may be selectively set in a check mode and an open mode.

In the check mode, the closure can pivot freely through the closure chamber such that the closure will pivot away from the seat in response to flow through the passage in a flow direction and will bear on the seat in response to flow through the passage in a reverse-flow direction. Thus, in the check mode, the closure allows flow through the passage in the flow direction and checks flow through the passage in the reverse-flow direction. In the open mode, the closure is supported substantially above flow through the passage to allow flow in the reverse-flow direction.

Other embodiments provide such pivot valves where the housing has a union face at the inlet adapted for connection to a flowline component by a flange union and a union face at the outlet adapted for connection to a flowline component by a flange union.

Additional embodiments provide such pivot valves where the valve seat is provided on an insert removably mounted in the housing.

In other such embodiments, the pivot valves comprise an axle mounted for rotation relative to the housing and a lug extending radially from the axle. The closure is mounted for pivoting movement about the axle. The lug supports the closure in its open mode when the axle is rotated to a first position and allows the closure to pivot freely in its check mode when the axle is rotated to a second position.

Still other embodiments provide such pivot valves where the axle extends through the housing and the pivot valve comprises a handle. The handle is coupled to the axle outside the housing and imparts rotation to the axle to move the axle between its first and second positions.

Additional embodiments provide such pivot valves where the handle engages the housing to selectively lock the handle in its first and second positions and thus selectively locks the closure in its open mode and its check mode.

Yet other embodiments provide such pivot valves where the handle comprises a pin adapted to extend into a blind hole on the exterior of the housing.

In other embodiments, such pivot valves comprise a blind chamber leading from the closure chamber where the closure is supported within the blind chamber when the closure is in its open mode. In yet other embodiments a service port and a cap removably covering the service port provide the blind chamber.

In other aspects and embodiments, the subject invention provides flapper valves for flow lines, especially high-pressure flow lines. The flapper valves comprise a valve housing that is adapted for assembly into the flow line. The housing has a passage providing a valve inlet and a valve outlet. A valve seat is in the passage. A flapper is mounted for pivoting freely through a flapper chamber in the passage. The flapper is adapted to pivot away from the seat in response to flow through the passage in a flow direction. The flapper will bear on the seat in response to flow through the passage in a reverse-flow direction. Thus, the flapper allows flow through the passage in the flow direction and checks flow through the passage in the reverse-flow direction. A hydrofoil extends from the flapper.

Other embodiments provide such flapper valves where the housing has a union face at the inlet adapted for connection to a flowline component by a flange union and a union face at the outlet adapted for connection to a flowline component by a flange union.

Additional embodiments provide such flapper valves where the valve seat is provided on an insert removably mounted in the housing.

Yet other embodiments provide such flapper valves where the hydrofoil comprises a strut extending axially from the flapper and a wing mounted on the strut. The wing extends substantially parallel to the flapper. The surfaces of the wing are shaped to provide lift to the flapper when fluid flows through the valve in the flow direction.

In other embodiments, the flapper valves comprise a blind chamber leading from the flapper chamber. The hydrofoil lifts the flapper into the blind chamber when fluid flows through the valve in the flow direction. In yet other embodiments a service port and a cap removably covering the service port provide the blind chamber.

In other aspects and embodiments, the subject invention provides for valve assemblies for flow lines, especially zipper valves and other high-pressure flow lines. The valve assemblies have a check condition allowing flow in a flow direction, a shut-off condition shutting off flow in both the flow direction and a reverse-flow direction, and an open condition allowing flow in both the flow direction and the reverse-flow direction. The valve assemblies comprise first and second novel pivot valves assembled in fluid communication with each other. The flow direction of the first pivot valve is the same as the reverse-flow direction of the valve assembly. The flow direction of the second pivot valve is the same as the flow direction of the valve assembly. Thus, the valve assembly may be set in its check condition by setting the first pivot valve in its open mode and the second pivot valve in its check mode. The valve assembly may be set in its shut-off condition by setting the first and second pivot valves in their check modes. The valve assembly may be set in its open condition by setting the first and second pivot valves in their open modes.

Other embodiments provide such valve assemblies comprising a pair of first pivot valves and a pair of the second pivot valves.

In other aspects and embodiments, the subject invention provides for valve assemblies having a check condition allowing flow in a flow direction and a shut-off condition shutting off flow in both the flow direction and a reverse-flow direction. The valve assemblies comprise a novel pivot valve and a check valve that are connected in fluid communication with each other. The flow direction of the pivot valve is the same as the reverse-flow direction of the valve assembly. The flow direction of the check valve is the same as the flow direction of the valve assembly. The valve assembly may be set in its check condition by setting the pivot valve in its open mode. The valve assembly may be set in its shut-off condition by setting the pivot valve in its check mode.

Other embodiments provide such valve assemblies where the check valve is a conventional flapper valve or a novel flapper valve comprising a hydrofoil.

In still other aspects and embodiments, the subject invention provides for zipper manifolds that selectively control flow into a plurality of wells. The zipper manifolds comprising a distribution pipe adapted to receive the flow into the zipper manifold and first and second novel valve assemblies. The first valve assembly is assembled in a flow line running from the distribution pipe to a first well. The second valve assembly is assembled in a flow line running from the distribution pipe to a second well. Flow may be selectively diverted from the distribution pipe into the first well or the second well by selectively setting the first and second valve assemblies in their check condition or shut-off condition.

Additional embodiments provide such valve assemblies where the assembly is mounted on a frame and systems for fracturing a well and other high-pressure fluid transportation systems comprising the novel valve assemblies or the novel zipper manifolds.

In yet other aspects and embodiments, the subject invention provides for flowline fittings. The fittings comprise a fitting body adapted for assembly into the flow line. A plenum is provided in the interior of the body. First and second straight-line bores extend, respectively, from first and second union faces on the exterior of the body into the plenum. The union faces are adapted for connection to a flowline component by a flange union.

Other embodiments provide such fitting where the plenum is spherical. In yet other embodiments the diameter of the plenum is at least about 150% of the diameter of the bore leading into the plenum or is from about 150% to about 250% of the diameter of the bore leading into the plenum.

Additional embodiments provide such fittings where the plenum is generally ovoidal or solid obroundal shaped. In other embodiments the minor diameter of the plenum is at least about 150% of the diameter of the bore leading into the plenum or is from about 150% to about 250% of the diameter of the bore leading into the plenum.

Further embodiments provide such fittings where the first and second bores extend relative to each other at an interior angle from substantially greater than zero to 90°. In other embodiments the first and second bores extend relative to each other at an interior angle from about 30° to 90° or extend perpendicularly to each other. In other such embodiments to fitting is an elbow fitting.

Yet other embodiments provide such fittings having a third straight-line bore extending from a third union face on the exterior of the body into the plenum. In some embodiments the third bore is aligned axially to the first bore or the first and second bores are perpendicular to each other. In other embodiments the fitting is a tee fitting.

Still other embodiments provide such fittings having a fourth straight-line bore extending from a fourth union face on the exterior of the body into the plenum. In some embodiments the first and second bores are perpendicular to each other, the third bore is aligned axially with the first bore, and the fourth bore is aligned axially with the second bore. In other embodiments the fitting is a cross junction.

Additional embodiments provide systems for fracturing a well and other high-pressure fluid transportation systems comprising the novel fittings.

Still other embodiments provide methods for assembling systems for fracturing a well and other high-pressure fluid transportation system. Such methods comprise assembling the novel pivot valves, novel flapper valves, novel valve assemblies, novel zipper manifolds, or novel fittings into the system by connecting them to other flowline components by flange unions.

Finally, still other aspects and embodiments of the invention provide apparatus and methods having various combinations of such features as will be apparent to workers in the art.

Thus, the present invention in its various aspects and embodiments comprises a combination of features and char-acteristics that are directed to overcoming various shortcomings of the prior art. The various features and characteristics described above, as well as other features and characteristics, will be readily apparent to those skilled in the art upon reading the following detailed description of the preferred embodiments and by reference to the appended drawings.

Since the description and drawings that follow are directed to particular embodiments, however, they shall not be understood as limiting the scope of the invention. They are included to provide a better understanding of the invention and the ways in which it may be practiced. The subject invention encompasses other embodiments consistent with the claims set forth herein.

Figure 1:
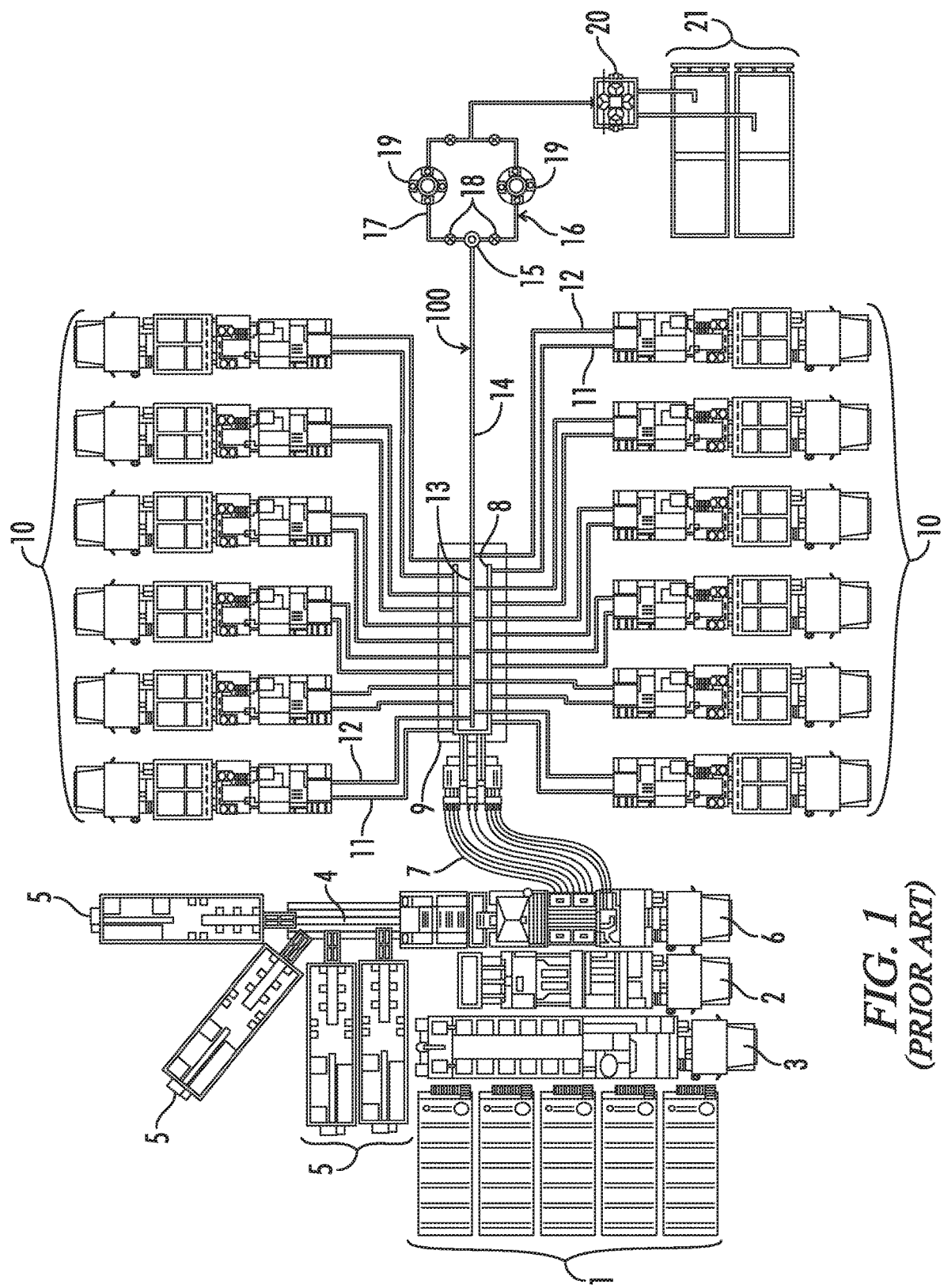
FIG. 1 (prior art) is a schematic view of a system for fracturing a well and receiving flowback from the well, which system includes a conventional zipper manifold incorporating conventional valves 18.

In the drawings and description that follows, like parts are identified by the same reference numerals. It also will be apparent from the discussion that follows that certain conventions have been adopted to facilitate the description of the novel systems which typically include large numbers of identical components. For example, as discussed below, zipper manifold 30 includes a plurality of identical rotatable elbows 35. Specific individual rotatable elbows 30 may be identified in the drawings, or referenced in the discussion as elbows 30a, 30b, 30c, etc. to distinguish a particular elbow 30 from another elbow 30. The drawing figures also are not necessarily to scale. Certain features of the embodiments may be shown exaggerated in scale or in somewhat schematic form and some details of conventional design and construction may not be shown in the interest of clarity and conciseness.

DESCRIPTION OF ILLUSTRATIVE EMBODIMENTS

The invention, in various aspects and embodiments, is directed generally to fluid transportation systems and flow lines and to components used in those systems, and especially to valves, valve systems, and zipper manifolds used to convey abrasive, corrosive fluids under high pressure. Various specific embodiments will be described below. For the sake of conciseness, however, all features of an actual implementation may not be described or illustrated. In developing any actual implementation, as in any engineering or design project, numerous implementation-specific decisions must be made to achieve a developer's specific goals. Decisions usually will be made consistent within system-related and business-related constraints. Specific goals may vary from one implementation to another. Development efforts might be complex and time consuming and may involve many aspects of design, fabrication, and manufacture. Nevertheless, it should be appreciated that such development projects would be routine effort for those of ordinary skill having the benefit of this disclosure.

The novel valves, valve systems, zipper manifolds, and flowline components typically will be used to connect process or flow units for temporary fluid transportation systems. They are particularly useful for temporary installations that must be assembled and disassembled on site and which may be installed in various locations. Such systems are common in chemical and other industrial plants, on marine dredging vessels, strip mines, and especially in the oil and gas industry. Frac systems, such as those shown in FIG. 1, are a very common application where temporary high-pressure flow lines are routinely assembled and disassembled at various sites to provide fluid conduits between process or flow units for different wells.

The novel valves, valve systems, zipper manifolds, and flowline components are particularly suited for use in frac systems such as the system shown in FIG. 1. For example, a first preferred embodiment 30 of the novel zipper manifolds of the subject invention may be used in frac systems instead of zipper manifold 16. The high-pressure discharge from pumps 10 is manifolded in missile 13 of frac manifold 9, fed into a single flow line 14, and thence into zipper manifold 30.

Figure 2:
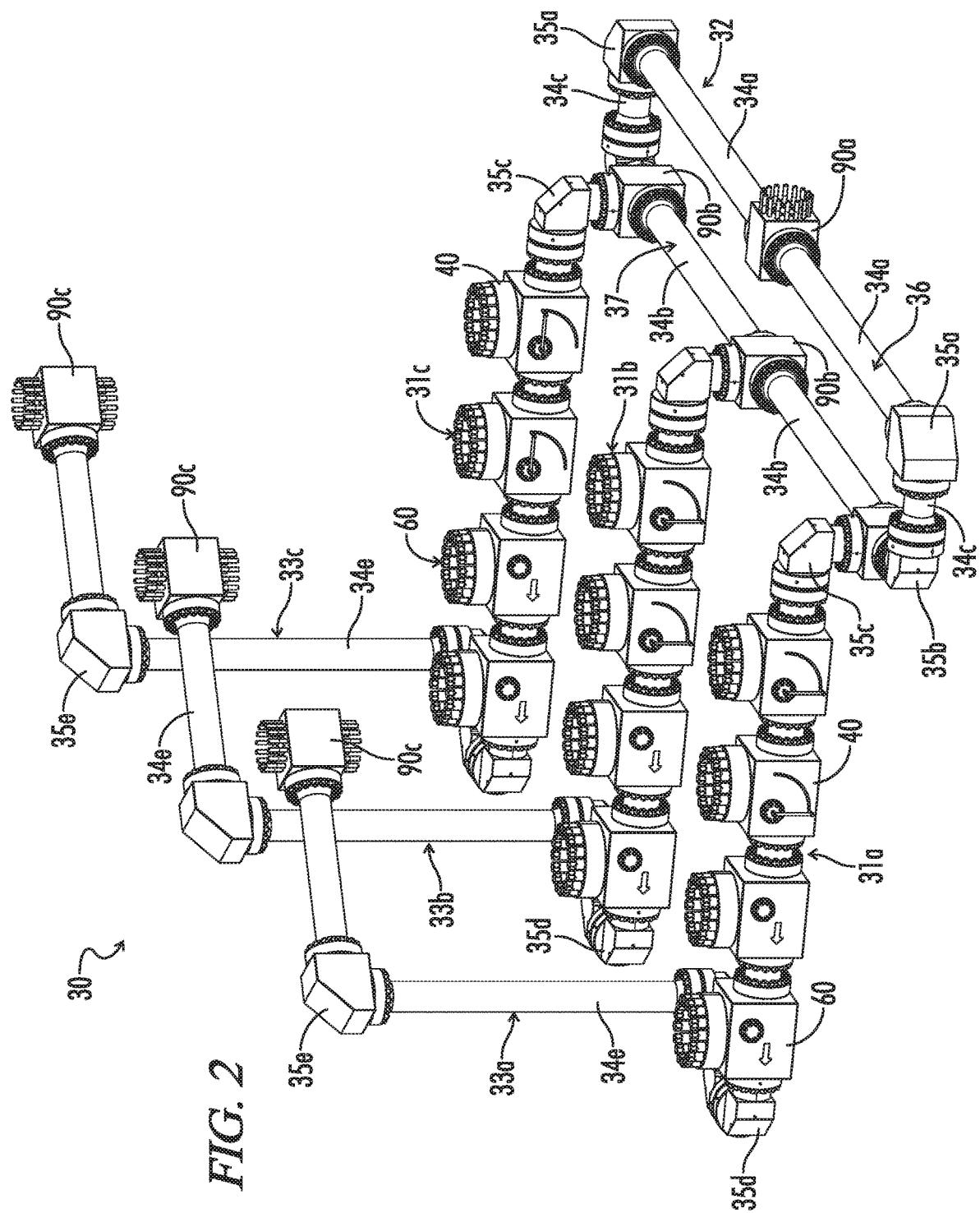
FIG. 2 is an isometric view, taken generally from above and to the left, of a first preferred embodiment 30 of the novel zipper manifolds of the subject invention incorporating a first preferred embodiment 31 of the novel valve assemblies.

Zipper manifold 30 is shown in FIG. 2. Like conventional zipper manifold 16, zipper manifold 30 can be used to selectively divert frac slurry into multiple well heads, for example, three well heads 19. Instead of conventional gate valves 18, however, zipper manifold 30 incorporates a first preferred embodiment 31 of the novel valve assemblies. Zipper manifold 30 also incorporates a distribution loop 32 instead of junction head 15.

More particularly, as shown in FIG. 2, zipper manifold 30 generally comprises distribution loop 32 and three wellhead flow lines 33. Distribution loop 32 receives flow from flow line 14 through a first preferred embodiment of the novel flowline components, tee fitting 90a. Wellhead flow lines 33 are connected to distribution loop 32 through additional tee fittings 90b. As described in further detail below, fluid may be selectively diverted into well heads 19 by selective operation of valves 40 in each wellhead flow line 33. For the sake of simplicity, well heads 19 are not shown in FIG. 2. It will be appreciated, however, that the novel flow lines may feed into any conventional wellhead assembly.

Distribution loop 32 generally comprises tee fittings 90a and 90b, spools 34a, 34b, and 34c, and rotatable flange elbow fittings 35a and 35b. Relatively long spools 34a are joined to tee fitting 90a and form what may be termed a splitter pipe 36. Long spools 34b are joined between tee fittings 90b and form what may be termed a distribution pipe 37. The ends of splitter pipe 36 and distribution pipe 37 are connected through rotatable elbows 35a and 35b and short spools 34c.

Figure 9:
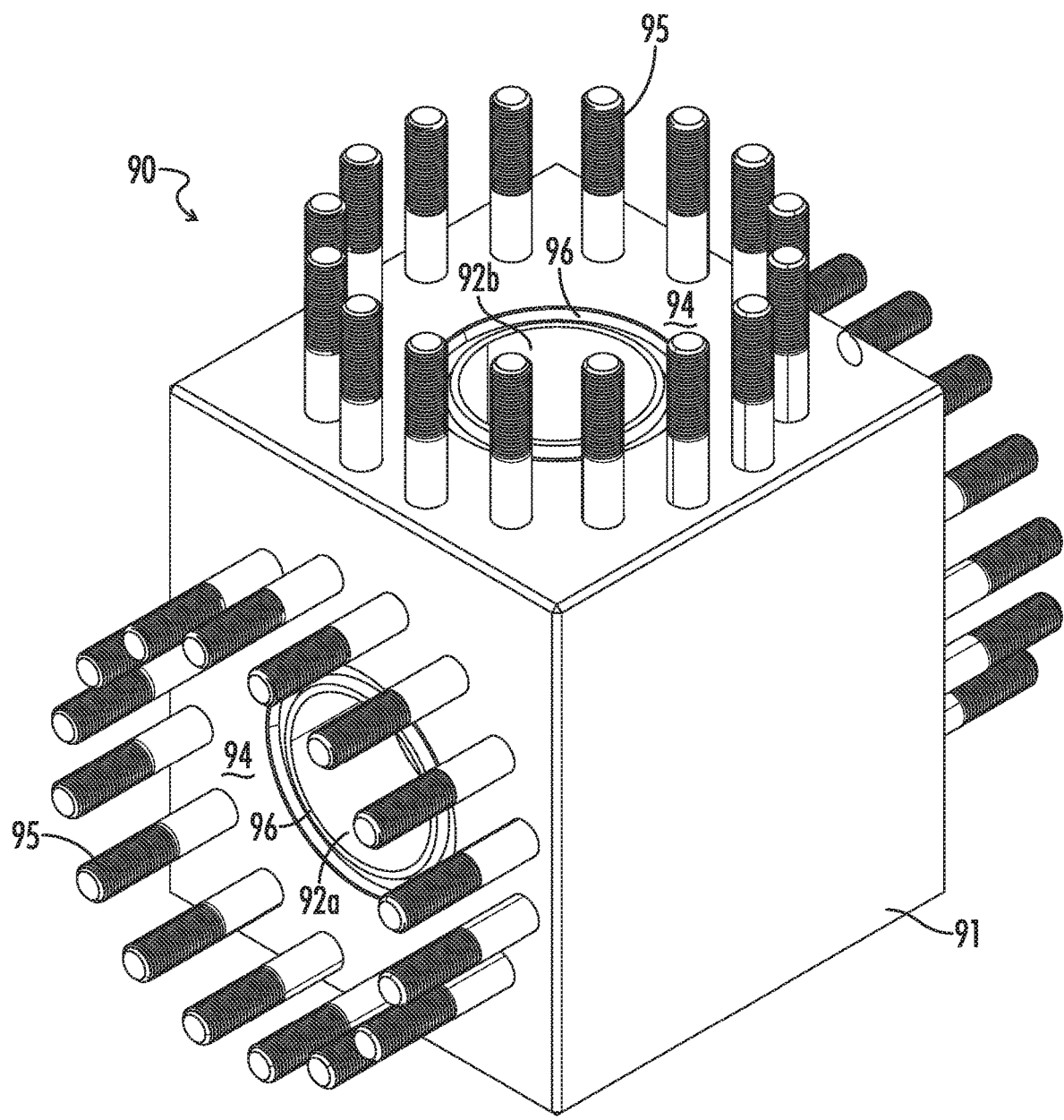
FIG. 9 is an isometric view of a first preferred embodiment 90 of the novel fittings.

Tee fittings 90 are described in further detail below, but it will be appreciated that they split flow coming into distribution loop 32, diverting it into each side of splitter pipe 36, and combine flow from both sides of distribution pipe 37, diverting the combined flow into a selected wellhead flow line 33. As shown in FIG. 9, tee fittings 90 are provided with union faces 94 having, for example, 16 threaded studs 95 that allow tee fittings 90 to be assembled into distribution loop 32 by conventional flange unions.

Spools 34 are conventional spools. As such they comprise a pipe which provides a conduit for conveying fluid between tee fittings 90. A pair of flanges are provided at each end of the pipe. Each flange has outer flat surfaces providing union faces and bolt holes accommodating the passage of threaded connectors. Like tee fittings 90, spools 34 are assembled into distribution loop 32 by flange unions.

Rotatable elbows 35 may incorporate rotatable flanges of conventional design, such as disclosed in U. S. Pub. No. 2007/0114039 A1 of M. Hobdy et al., or they may a rotatable elbow disclosed in applicant's co-pending U.S. patent application Ser. No. 15/845,884, filed Dec. 18, 2017. The construction of rotatable elbows 35 will not be discussed in detail herein, but suffice it to say that rotatable elbows 35b allow relative rotation with and between the components to which they are assembled. Preferably, as exemplified, rotatable elbows 35 are provided with union faces and threaded studs allowing them to be assembled into distribution loop 32 through flange unions.

It will be appreciated that distribution loop 32 improves the performance of zipper manifold 30 in various ways. For example, rotatable elbows 35b allow splitter pipe 36 to pivot about the axis of distribution pipe 37, and rotatable elbows 35a allow splitter pipe 36 to rotate on its axis. That will allow splitter pipe 36 to be raised, lowered, and rotated as necessary to position tee fitting 90a for connection to flow line 14.

Moreover, introducing fluid into splitter pipe 36 will tend to reduce the tendency of sand or other particulates to settle and clog zipper manifold 30. That is, in many conventional zipper manifolds, fluid is pumped directly into a distribution pipe. When a particular well is being fractured, fluid will flow through a portion of the distribution pipe leading to the selected wellhead flow line. There may be essentially no flow, however, through other portions of the distribution pipe. Particulates in those portions of a distribution pipe can settle and become entrained and encrusted.

For example, if fluid was introduced directly into distribution pipe 37 at tee junction 90b of wellhead flow line 33a, there would be no flow through those portions of distribution pipe 37 connected to wellhead flow lines 33b and 33c. Splitter pipe 36, however, directs flow through the entire distribution loop 32 regardless of where fluid is discharged from distribution pipe 37. Thus, there will be less settling and buildup of particulates in distribution loop 31.

It will be appreciated, however, that other embodiments of the novel zipper manifolds may incorporate other systems for distributing fluid into the well head flow lines. If desired, a simple distribution pipe may be provided as referenced above. In that event, a swivel assembly of three rotatable elbows 35, for example, could provide flexibility in assembling a flow line from the frac manifold. Tee fittings 90 are described in detail below, and preferably are incorporated into the novel manifolds. Conventional tee fittings, however, may be used if desired to split flow into splitter pipe 36 and to combine flow from distribution pipe 37. If desired, any conventional system for distributing fluid into the well head flow lines may be used.

Wellhead flow lines 33 each generally comprise valve assembly 31, along with upstream connections to distribution pipe 37 and downstream connections to a particular well head 19. As will be appreciated from the discussion that follows, zipper manifold 30 as shown in FIG. 2 is set to divert flow through well head flowline 33c. Valve assemblies 31a and 31b are both in a shut-off condition, while valve assembly 31c is in a check condition.

Each valve assembly 31 has a pair of a first preferred embodiment 40 of the novel pivot valves and pair of a first preferred embodiment 60 of the novel flapper valves. As shown in greater detail in FIG. 3, pivot valves 40 and flapper valves 60 are connected in line by short spools 34d. Upstream pivot valve 40 is connected to tee fitting 90b of distribution pipe 37 by a short spool 34d. Referring again to FIG. 2, downstream flapper valve 60 is connected to well head 19 by a short spool 34e, three rotatable elbows 35d, a long spool 34e, another rotatable elbow 35e, another long spool 35e, and a tee fitting 90c.

Rotatable elbows 35c, 35d, and 35e provide great flexibility in laying out valve assemblies 31 and well head flow lines 33. Other conventional directional fittings and conduits, however, may be used to connect valve assemblies 31 to distribution pipe 37 and to well heads 19. For example, various combinations of angled shims, standard spools, and offset spools may be used as described in applicant's U.S. Pat. App. Pub. 2018/0187507. Conventional swivel joints also may be used.

Figure 4A:
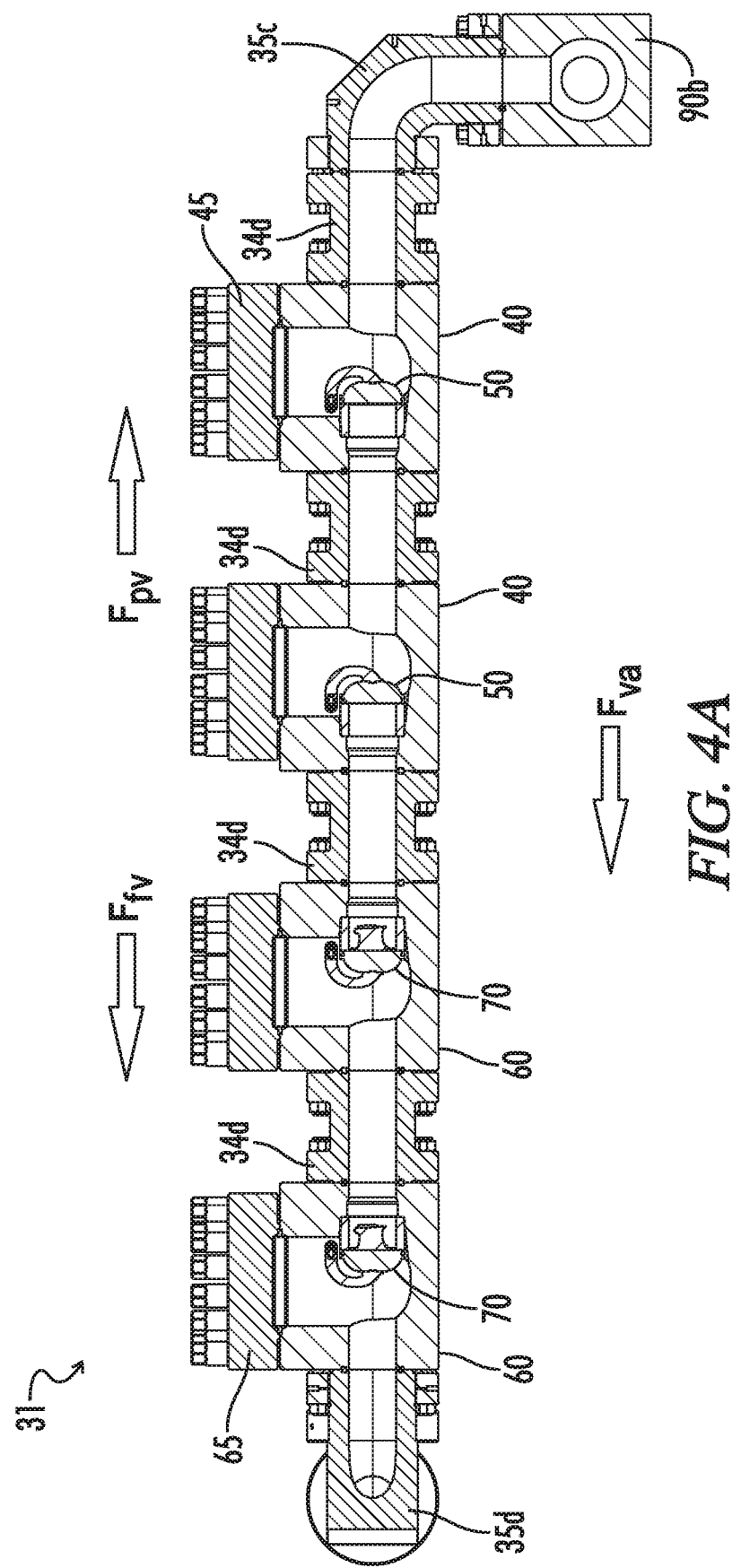
FIG. 4A is a cross-sectional view of the portion of flow line 33 shown in FIG. 3 taken generally along its primary axis showing valve assembly 31 in its shut-off condition, in which shut-off condition pivot valves 40 are in their check mode.
Figure 4B:
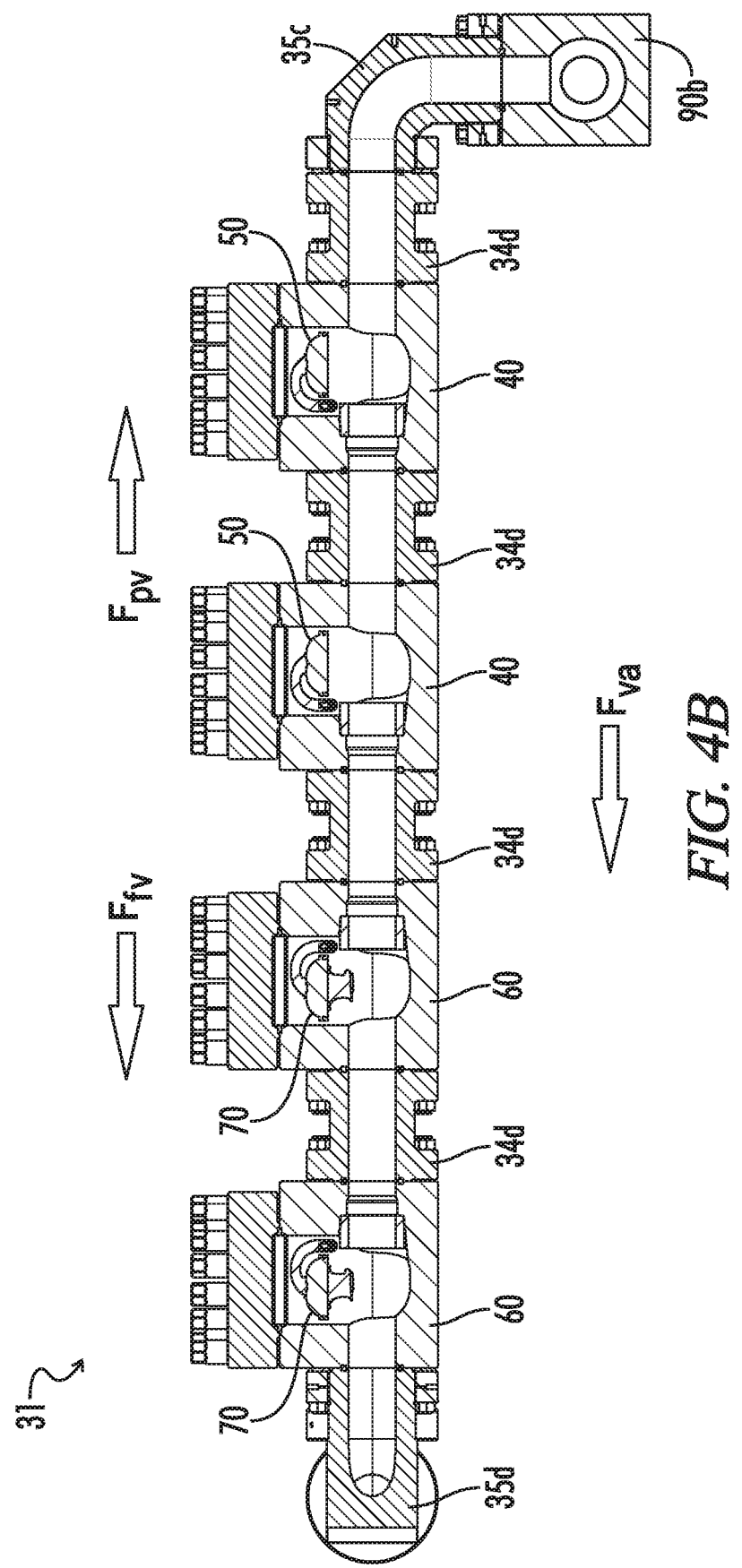
FIG. 4B is a cross-sectional view as in FIG. 4A except that valve assembly 31 is in its check condition, in which pivot valves 40 are in their open mode.
Figure 5A:
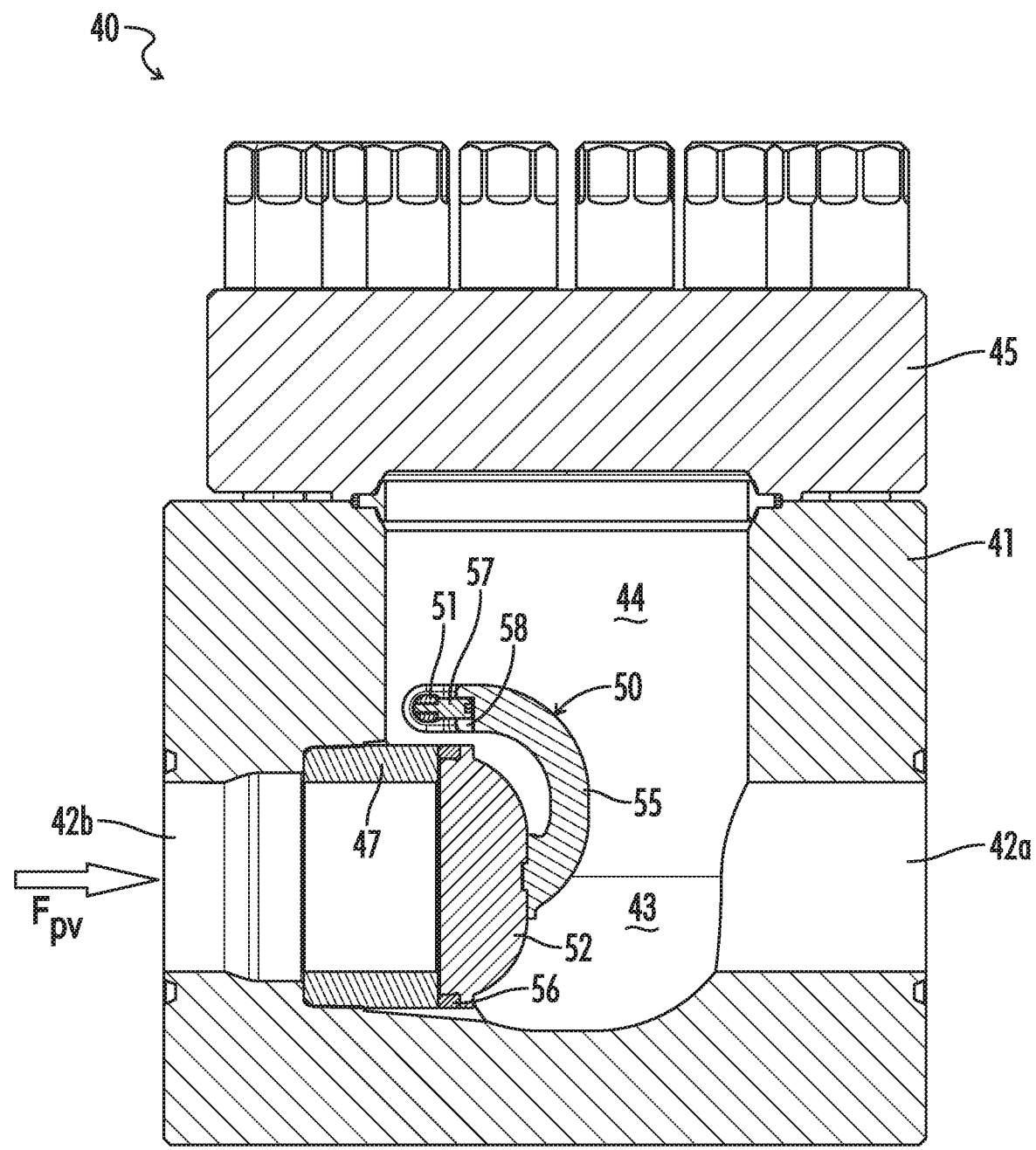
FIG. 5A is a cross-sectional view of pivot valve 40 in its check mode with closure 52 being in its check position.
Figure 5B:
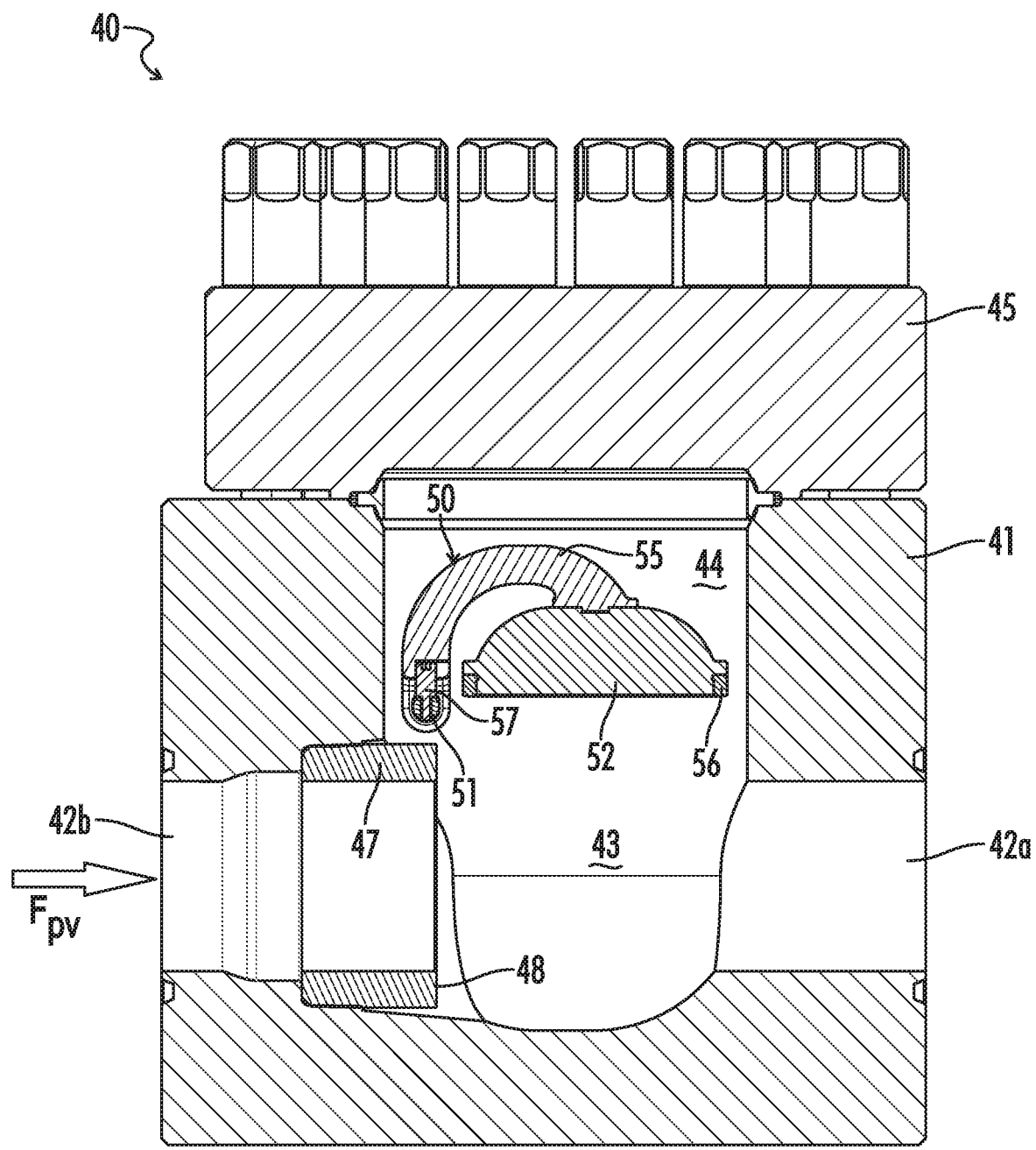
FIG. 5B is a cross-sectional view of pivot valve 40 in its open mode.

Pivot valve 40 is shown in greater detail in the cross-sectional views of FIGS. 4 and 5. FIGS. 4A and 5A show pivot valve 40 in a check mode, and FIG. 4B and FIG. 5B show valve 40 in an open mode. As may be seen therein, pivot valve 40 generally comprises a valve housing 41 in which is mounted a closure assembly 50 and a sleeve 47. Closure assembly 50 includes a closure 52 that can bear on a seat 48 on sleeve 47 to shut off flow through valve 40, or that can pivot away from seat 48 to allow flow.

Housing 41 provides the primary structure or base to which other components of a flow line will be connected, and to which the other components of valve 40 will be assembled. It also defines a passage through valve 40. More specifically, housing 41 is provided with a horizontally extending inlet bore 42a and a horizontally extending outlet bore 42b which communicate with each other through a closure chamber 43. Bores 42 and closure chamber 43 may be shaped and configured as in conventional flapper valves, typically with a view towards minimizing turbulence through valve 40. Closure chamber 43 preferably will accommodate, but closely fit the pivoting movement of closure 52.

A service port 44 extends vertically through the upper portion of housing 41 from closure chamber 43. Service port 44 provides access to closure assembly 50 and sleeve 47 so that they may be replaced or serviced. It preferably will be sized and configured accordingly. A cap 45 is joined to housing 41 over service port 44 by a flange union. It will be noted that there is no precise boundary between service port 44 and closure chamber 43. They are essentially one continuous chamber. A distinction is made herein, however, to demarcate service port 44 as an area in large part removed from the main flow of fluid passing from inlet bore 42a, through closure chamber 43, and into outlet bore 42b. When cap 45 is installed, service port 44 is essentially a blind chamber. While eddy currents will form within service port 44, the main flow of fluid through pivot valve 40 will flow below service port 44.

Figure 6A:
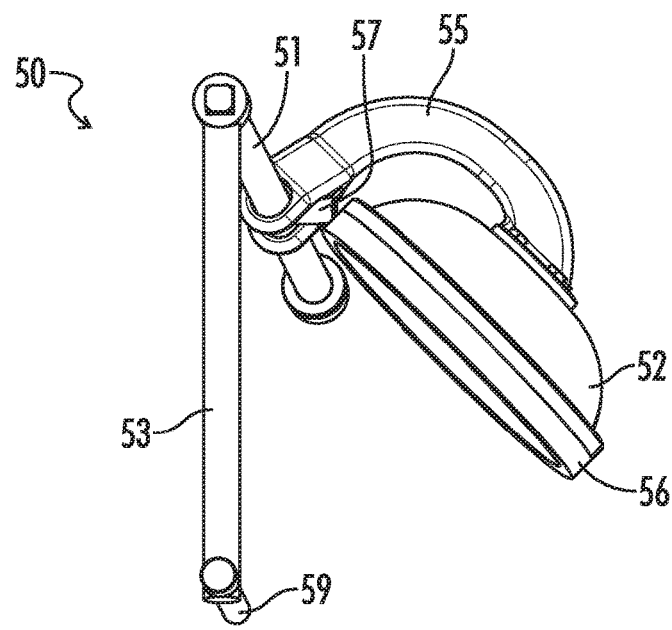
FIG. 6A is an isometric view, taken slightly off axis and below, showing flapper assembly 50 of pivot valve 40 in its check mode.
Figure 6B:
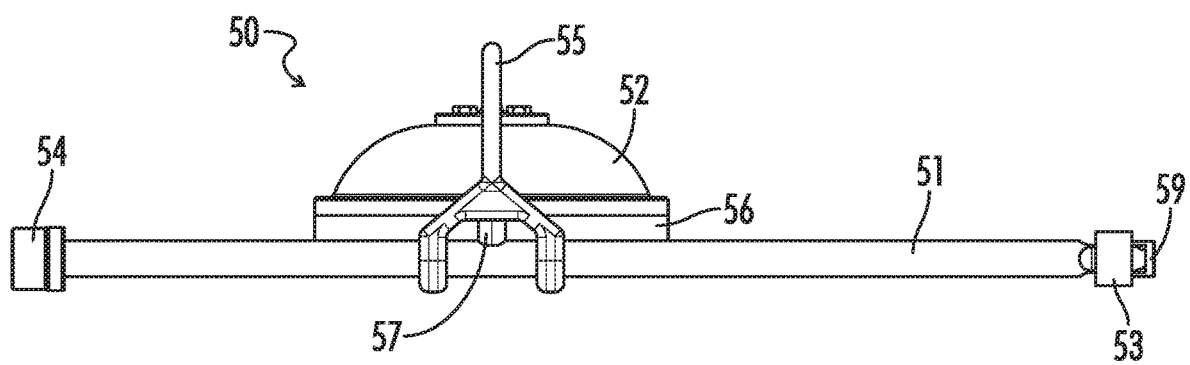
FIG. 6B is a top, plan view of flapper assembly 50 of pivot valve 40 in its check mode.

As best seen in FIG. 6, closure assembly 50 generally comprises an axle 51, closure 52, and a handle 53. Axle 51 is mounted in housing 41 for rotation. Preferably, as discussed further below, axle 51 is mounted in service port 44 somewhat above and behind the face of seat 48. Axle 51 otherwise may be mounted for rotation and sealing by any conventional mechanism. For example, one end of axle 51 may be provided with a bearing assembly 54 that fits within a recess (not shown) provided in an interior wall of service port 44. The other end extends to the exterior of valve 40 through an opening in an opposing wall of service port 44 and an opening in an axle bonnet 46. Axle bonnet 46 may be seen best in FIG. 3. It is mounted to housing 41 by a flange union and will be provided with conventional annular packings (not shown) to facilitate sealing around and rotation of axle 51.

Closure 52 is a generally disc-like body that is pivotally mounted to axle 51 by closure arm 55. Closure arm 55 has an arcuate shape, curving away and down from axle 51. One end of closure arm 55 is split into two axle arms, each of which has an opening through which axle 51 may pass. The interior of the openings is provided with a bearing surface or assembly allowing relative rotation between closure arm 55 and axle 51. The other end of closure arm 55 has a plate-like terminus. Closure 52 is attached to closure arm 55, for example, by threaded fasteners extending through apertures in the terminus of closure arm 55 and into the back of closure 52. Closure 52 thus is able to pivot about axle 51 into and out of engagement with seat 48 along an arc extending through service port 44 and closure chamber 43.

Closure 52 is similar to the flappers used in conventional flapper valves, and there are many conventional flapper designs that may be adapted for use in the novel pivot valves. For example, closure 52 preferably is provided with an annular, elastomeric seal 56 extending around the periphery of the face of closure 52 to assist in forming an effective seal between closure 52 and seat 48. Coatings or coverings also may be applied to closure 52 to protect it from erosion, or in lieu of an elastomeric seal to assist in forming an effective seal. For example, it may be provided with a rubber covering, such as carboxylated nitrile butadiene rubber (XNBR) or urethane rubber.

Sleeve 47 is a generally open, relatively short cylindrically shaped component. It is removably mounted in an enlarged, inner diameter portion of inlet bore 42a, for example, by a frictional fit. Sleeve 47 and seat 48, however, may be configured and mounted in various ways as are common for sleeves and seats in conventional flapper valves. It may be mounted, for example, by a threaded connection. The valve housing also may be assembled from a pair of subs, allowing a sleeve to be mounted between the subs and replaced by disassembling and assembling the subs. A sleeve may be provided with a beveled inner end to provide an angled seat. An angled seat will encourage the pivoting closure to rest against the seat in its check mode. Providing a seat on a sleeve is greatly preferred as it allows the seat to more easily repaired or replaced. If desired, however, a seat could be formed as an integral part of the valve housing.

Regardless, when valve 40 is in its check mode, as shown in FIGS. 4A and 5A, closure 52 will tend to assume a check position. That is, it will tend to hang under the influence of gravity directly down and against seat 48 on sleeve 47. Fluid flowing into inlet bore 42a, in what may be termed the flow direction $F_{pv}$ of pivot valve 40, will flow against closure 52 causing it to pivot away from seat 48 and upwards toward service port 44. It will tend to float above the flow through valve 40. If fluid enters outlet bore 42b in a reverse-flow direction, however, closure 52 will be urged against seat 48 to check flow through valve 40. Thus, in its check mode, pivot valve 40 operates in the same manner as conventional flapper valves.

When valve 40 is in its open mode, however, closure assembly 50 supports closure 52 substantially above flow through closure chamber 43. Thus, fluid is allowed to flow through valve 40 in a direction opposite to flow direction $F_{pv}$, that is, in a reverse-flow direction. Closure 52 will not check reverse flow through valve 40.

More particularly, as perhaps best seen in FIG. 6A, a lug 57 extends radially from axle 51. Preferably lug 57 is removably assembled to axle 51, for example, by a bolt or other threaded connector, to facilitate installation of axle 51 and closure assembly 50. In any event, when valve 40 is in its check mode, as shown in FIG. 5A, lug 57 is oriented more or less horizontally and extends into a blind channel 58 provided at the junction of the axle arms of closure arm 55. Blind channel 58 is open below lug 57, so closure arm 55 and closure 52 are free to pivot away, respectively, from lug 57 and seat 48. As closure 52 returns to its check position, lug 57 will key through blind channel 58 to guide closure arm 55, thereby aligning closure 52 on seat 48.

When valve 40 is in its open mode, however, as shown in FIG. 5B, axle 51 is rotated such that lug 57 is more or less pointed vertically upward. Closure 52 now is supported mechanically in a more or less horizontal position within service port 44 by interference between lug 57 and the blind end of channel 58. Closure 52 is positioned substantially above any flow passing through valve 40 and cannot pivot downwards to check reverse flow. Flow is allowed in both directions through valve 40.

Figure 3:
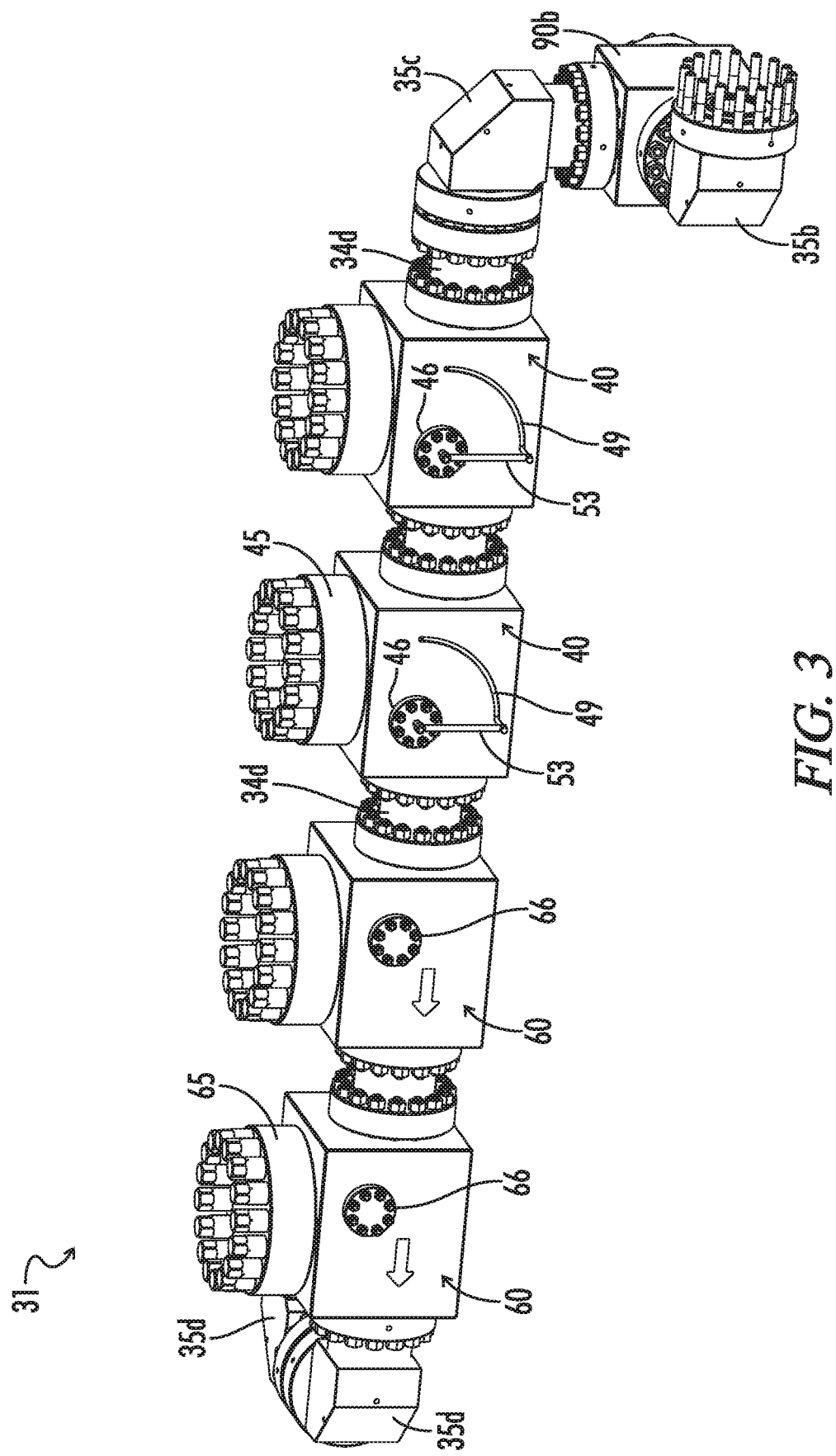
FIG. 3 is an enlarged isometric view of zipper manifold 30 shown in FIG. 2 showing a portion of one of the zipper flow lines 33 that will be connected to well heads 19, which portion incorporates novel valve assembly 31 which in turn includes first preferred embodiments 40 of the novel pivot valves and first preferred embodiments 60 of the novel flapper valves.

Handle 53 allows valve 40 to be set in either its check or its open mode. As will be appreciated by referencing FIGS. 3 and 6A, handle 53 is attached to the end of axle 51 that extends through housing 41 to the exterior of valve 40. Preferably, handle 53 is removably assembled to axle 51 to facilitate installation of closure assembly 50. FIG. 3 shows handle 53 with valve 40 in its check mode. Valve 40 may be set in its open mode by moving handle 53 90° in a counterclockwise direction.

A mechanism preferably is provided to releasably lock handle 53 in check and open positions. For example, handle 53 is provided with a pin 59. Pin 59 is slideably mounted through a hole at the end of handle 59. As handle 53 is moved between its check and open positions, the tip of pin 59 will travel through an arcuate groove 49 provided on the exterior of housing 41. Blind holes (not shown) are provided at each terminus of groove 49, into which pin 59 may be inserted to selectively lock handle 53, thereby locking valve 40 in its check and open modes. Pin 59 preferably is biased against groove 49 and housing 41 such that once properly aligned, it automatically inserts itself into the blind holes.

Thus, it will be appreciated that the novel pivot valves, such as exemplified valve 40, operate in many respects as do conventional flapper valves. They may be installed in a flow line and placed in their check mode to allow flow in a flow direction and to check flow in the opposite direction. Unlike conventional valves, however, the novel pivot valves are provided with an open mode in which reverse flow through the valve is allowed. Thus, the novel pivot valves may be used either to check or to allow reverse flow, allowing them to be used in systems for which conventional flapper valves are unsuitable.

Moreover, it will be appreciated that in conventional flapper valves, the pivot axis of the flapper is closely adjacent to and more or less in the same plane as the faces of the flapper and seat. When the pivot axis is situated in the same plane as a vertically oriented seat, the flapper will bear with less force on the seat. It may not provide an effective seal, especially in low flow situations. For that reason, many flapper valves incorporate a beveled sleeve that provides an angled seat, or they have a flapper with an over-weighted face. By mounting axle 51 slightly behind the face of seat 48, however, closure 52 will be further encouraged to bear on seat 48.

Moreover, if the pivot axis is located closely adjacent to the flapper, the flapper will pivot away from, but will still float on the main flow through the valve. The face of the flapper will suffer the effects of abrasive fluid flowing across it. In the exemplified novel valve 40, however, axle 51 is mounted somewhat above the face of seat 48. Closure arm 55 is configured such that closure 52 is positioned on seat 48 to check flow, but when valve 40 is in its open mode, closure 52 will be supported well above flow. It is believed, therefore, that closure 52 will be less susceptible to erosion and other damage that may impair its ability to form an effective seal on seat 48. It will be appreciated, of course, that closure arm 55 may be modified to allow axle 51 to be mounted further above or back, as desired, while still allowing closure 52 to be supported above the main flow through valve 40 in its open mode.

It will be appreciated that closure assembly 50 as exemplified in valve 40 provides a simple, reliable mechanism for placing valve 40 in its check and open modes. Other mechanisms may be used, however, and closure assembly 50 may be modified in many respects as will be apparent to workers in the art. For example, the handle may be of various designs and may incorporate grips and other ergonomic features to facilitate manual operation of the novel pivot valves. Other conventional mechanisms for selectively locking a handle may be employed. Hydraulic or electronic systems may be employed to rotate the axle, and conventional control systems may be employed to enable remote operation of the novel valves.

Flapper valve 60, which is shown in greater detail in FIG. 7, in many respects is identical or similar to pivot valve 40. Similar to pivot valve 40, flapper valve 60 generally comprises a valve housing 61 in which is mounted a flapper assembly 70 and a sleeve 67. Housing 61 provides the base or primary structure for valve 60. It is identical to housing 41 of pivot valve 40 except in respect to those features allowing mounting of flapper assembly 70 instead of closure assembly 50. Housing 61 is provided with an inlet bore 62a, a flapper chamber 63, and an outlet bore 62b which form a passage through valve 60.

A service port 64 extends into flapper chamber 63 and provides access to flapper assembly 70 and sleeve 67. A cap 65 is provided to close service port 64. As best seen in FIG. 8, flapper assembly 70 generally comprises an axle 71 and a flapper 72. Axle 71 is mounted in housing 61. Unlike axle 51 of pivot valve 40, however, axle 71 of flapper valve 60 need not be mounted for rotation. For reasons that will become apparent from the discussion that follows, it may be fixedly mounted in housing 61. For example, the ends 74 of axle 71 may be press fitted within recesses (not shown) provided in an axle bonnet 66 and the opposing wall of service port 64. Axle 71, in general, may be mounted in any conventional manner.

Flapper 72 is a generally disc-like body that is pivotally mounted to axle 71 by flapper arm 75. Flapper arm 75 is identical to flapper arm 55 in pivot valve 40. One end of flapper arm 75 is split into two axle arms, each of which has an opening through which axle 71 may pass. The other end has a plate-like terminus to which flapper 72 is attached.

Sleeve 67 also is identical to sleeve 47 of pivot valve 40. It is removably mounted in an enlarged, inner diameter portion of inlet bore 62a and its inner end provides a seat 68 upon which flapper 72 may bear to shut off flow through valve 60. It may be mounted by a frictional fit, as illustrated, or by other conventional means. Like sleeve 47 of pivot valve 40, sleeve 67 may be provided with a beveled inner end to provide an angled seat. It also may be formed as an integral part of the valve housing.

Figure 7A:
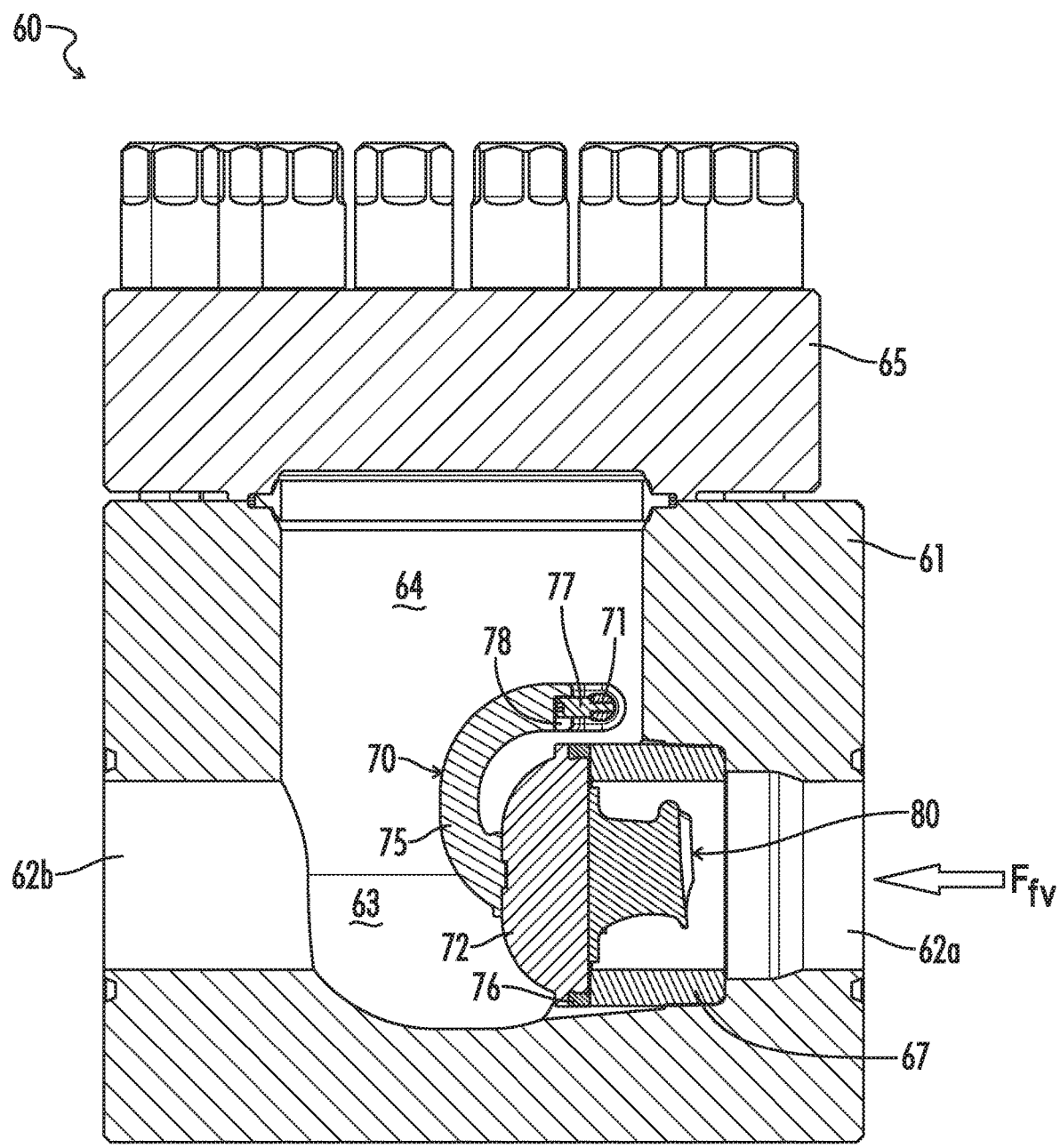
FIG. 7A is a cross-sectional view of flapper valve 60 with flapper 72 in its check position.
Figure 7B:
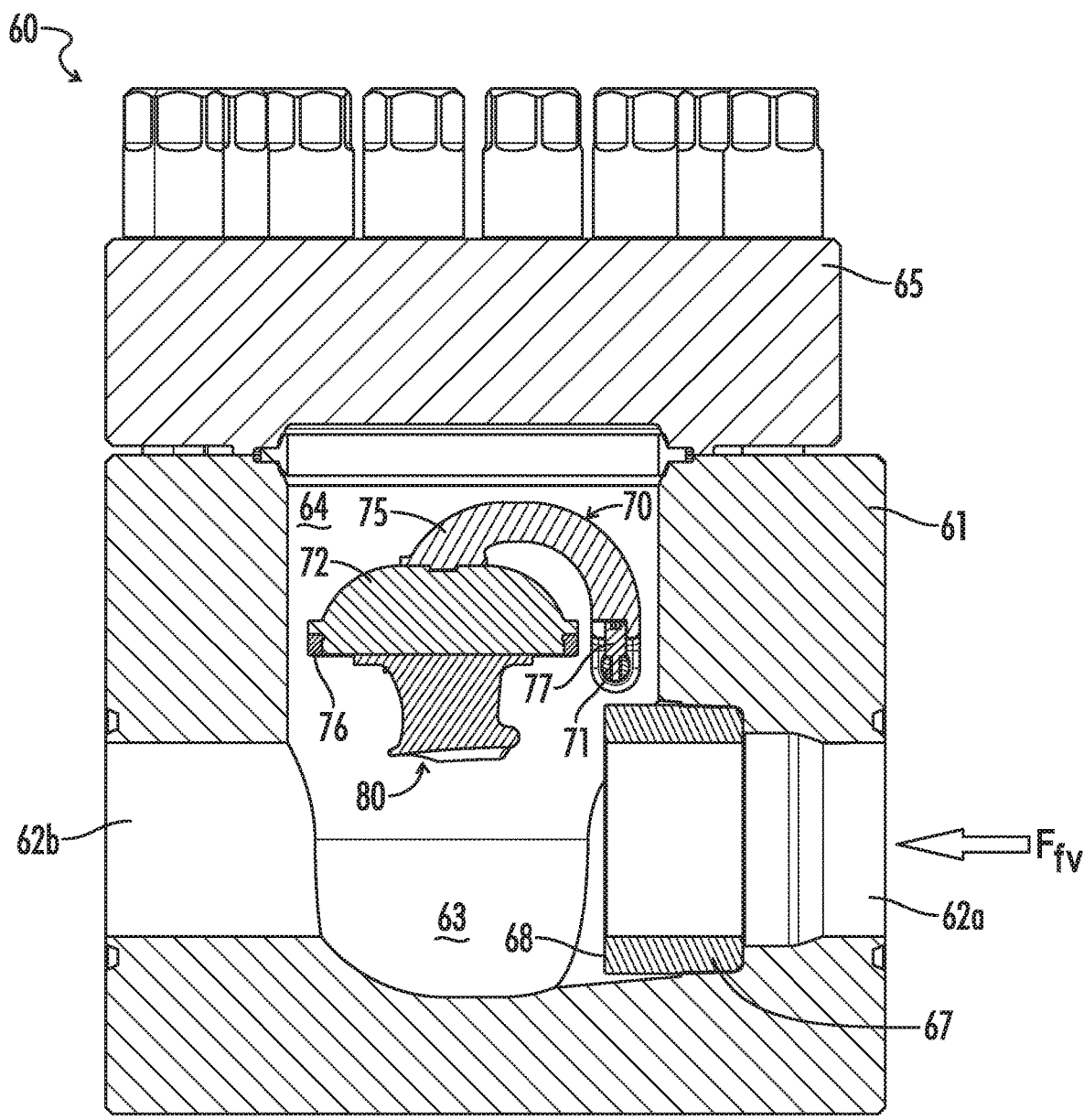
FIG. 7B is a cross-sectional view of flapper valve 60 with flapper 72 in its flow position.

Flapper 72 of valve 60 will tend to hang down and against seat 68 on sleeve 67 in a check position as shown in FIGS. 4A and 7A. Fluid flowing into outlet bore 62a in a direction opposite to the flow direction $F_{fv}$ of flapper valve 60 will cause flapper 72 to bear against seat 68, thus checking reverse flow through valve 60. Like pivoting closure 52, flapper 72 in flapper valve 60 preferably is provided with an annular, elastomeric seal 76 extending around the periphery of the face of flapper 72 to assist in forming an effective seal between flapper 71 and seat 68.

When fluid enters inlet bore 62a in the flow direction $F_{fv}$ of valve 60, however, it will flow against flapper 72. Flapper 72 will pivot away from seat 68 and upwards toward service port 64, as may be seen in FIGS. 4B and 7B. It will tend to float above the flow through flapper chamber 63. In that respect valve 60 operates like a conventional flapper valve. Unlike flappers in conventional flapper valves, however, flapper 72 is provided with a hydrofoil 81. Hydrofoil 81 will enhance the tendency of flapper 72 to float on flow passing through valve 60 while minimizing exposure of its face to the abrasive fluid flowing underneath it.

As seen best in FIG. 8, hydrofoil 80 comprises a base 81, a strut 82, and a wing 83. Base 81 is a generally disc shaped feature by which hydrofoil 80 may be mounted to the face of flapper 72. For example, bolts or other threaded connections may be passed through openings in base 81 of hydrofoil 80 into threaded holes in flapper 72. Strut 82 extends generally normally from base 81 and supports wing 83 away from flapper 72. Strut 82 preferably will be shaped to minimize resistance and to encourage laminar flow around it. Wing 83 will have a shape to provide lift to flapper 72 as it pivots away from seat 68 and then to stabilize flapper 72 in a more or less horizontal position within service port 64.

Figure 8A:
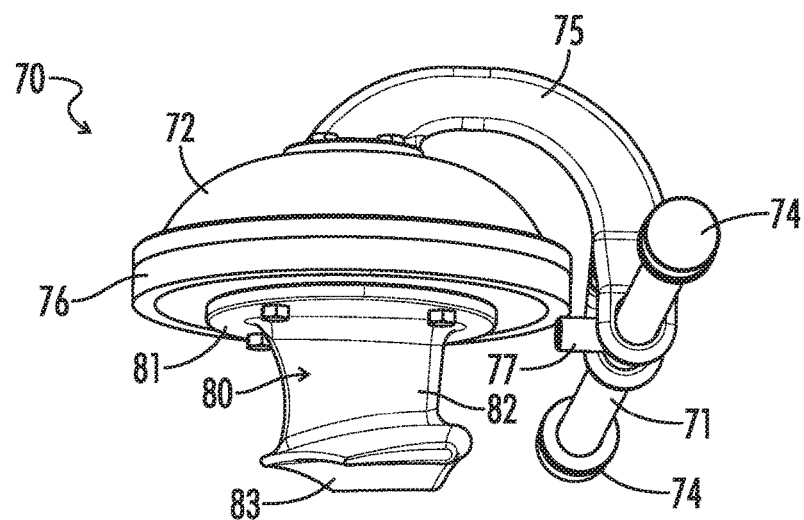
FIG. 8A is an isometric view, taken slightly off axis and below, of flapper assembly 70 of flapper valve 60 in its flow position.
Figure 8B:
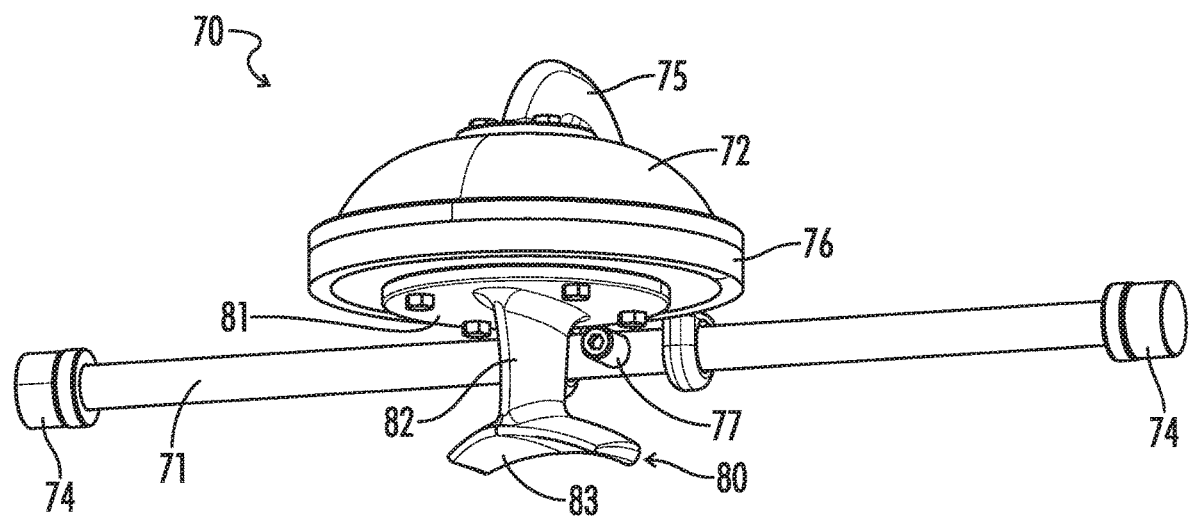
FIG. 8B is an isometric view, taken generally to the rear and below, of flapper assembly 70 of flapper valve 60 in its flow position.

As best seen in FIG. 8A, like closure assembly 50 of pivot valve 40, flapper assembly 70 also has a lug 77 extending radially from axle 71. Lug 77 is oriented more or less horizontally and extends into a blind channel 78 provided at the junction of axle arms of flapper arm 75. Blind channel 78 is open below lug 77, so flapper 72 is free to pivot away from seat 48. As flapper 72 returns to its check position, lug 77 will guide flapper arm 75 to help ensure that flapper 72 seats properly on seat 68.

Thus, it will be appreciated that the novel flapper valves, such as exemplified valve 60, have similar features and operate in many respects as do conventional flapper valves. They may be installed in a line to allow flow in a flow direction and to check flow in the opposite direction. Unlike conventional flapper valves, however, the novel flapper valves are provided with a hydrofoil allowing the flapper to float substantially above flow through the valves.

That is, in conventional flapper valves, the flapper pivots away from the seat and floats on the main flow of fluid passing through the valve. During fracturing operations, therefore, the face of the flapper will be exposed to abrasive fluid flowing at high rates for extended periods of time. It quickly can become eroded to a point where it is unable to provide an effective seal on the seat. In contrast, hydrofoil 80 supports flapper 72 above the main flow of fluid passing through valve 60 where it is less exposed to the fluid's erosive effects. That will help extend the service life of flapper 72 and avoid damage that may impair its ability to form an effective seal on seat 68.

Because frac systems are required at a site for a relatively short period of time, the novel valves, like other frac iron components, preferably are joined to other flowline components by unions. Unions allow the components to be connected ("made up") and disconnected ("broken down") relatively quickly. Thus, as exemplified, housing 41 and 61 of, respectively, pivot valve 40 and flapper valve 60 are provided with flange union faces allowing them to be assembled to other flowline components by a flange union. Housings 41 and 61, however, may be provided with other subs allowing valves 40 and 60 to be joined by other conventional unions, such as hammer (or "Weco®") unions or clamp (or "Greyloc®") unions. They also may be provided with threaded connections.

Housings 41 and 61 also preferably have a generally polyhedral or prismatic shape, such as the exemplified cubic shape. Polyhedral shapes allow the housings to be provided easily with flange union faces. They may have other designs, however, such as generally tubular designs more amenable to incorporation of subs for hammer and clamp unions. Such tubular designs also may incorporate flanges for flange unions.

Moreover, while a unitary housing is generally preferred, housings 41 and 61 also may be assembled from two or more components. For example, they may have a two-piece design to allow access to a seat sleeve for servicing or replacement. As a further example, a hammer union or clamp union sub may be fabricated separately and assembled to abase or core component to allow the novel valves to be joined by other types of unions.

It will be appreciated that the novel valve may be modified in various other ways consistent with the invention. For example, pivot valve 40 or flapper valve 60 may be provided with a bleeder port allowing a pressure relief valve to be assembled to the valve. Flange union faces may be provided around the port to allow the valve or a valve assembly to be joined to the Junction by a flange union. A port also may be provided to allow assembly of a gauge, such as a pressure or flow gauge, to valves 40/60.

Thus, the pivot valves and flapper valves of the subject invention may be used in a variety of high-pressure flow lines. The novel flapper valves, for example, may be employed in any system in which conventional flapper valves have been used. They may be used to particular advantage, however, in zipper manifolds. For example, as noted, valve assemblies 31 in wellhead flow lines 33 of zipper manifold 30 each comprise a pair of pivot valves 40 and a pair of flapper valves 40 assembled in line. By selectively setting pivot valves 40 in their check or flow modes, valve assemblies 31 may be used effectively as a combined shut-off and check valve, allowing zipper manifold 30 to selectively divert flow into multiple well heads 19.

More particularly, as shown in FIG. 4, pivot valves 40 are assembled into flow lines 31 in their reverse-flow orientation, that is, with their flow direction $F_{pv}$ oriented against the flow direction $F_{va}$ of valve assemblies 31 in flow lines 33. Flapper valves 60 are assembled in their flow orientation, that is, with their flow direction $F_{fv}$ oriented with the flow direction $F_{va}$ of valve assemblies 31. Thus, when pivot valves 40 are set in their check mode, as shown in FIG. 4A, valve assembly 31 is in a shut-off condition. Flow in the flow direction $F_{va}$ of valve assembly 31 will be checked by pivot valves 40. Flow in the reverse-flow direction of valve assembly 31 will be checked by flapper valves 60. Flow in both directions through valve assembly 31 and flow line 33 is effectively shut off.

Valve assembly can be set to a check condition by setting pivot valves 40 in their open mode as shown in FIG. 4B. Closures 52 of pivot valves 40 are supported in service port 44, allowing reverse flow through pivot valves 40. Flappers 62 of flapper valves 60 will pivot upward into service port 64 to allowing flow through flapper valves 60, but will pivot downward against seat 68 to check reverse flow through valves 60. Flow is allowed through valve assembly 31 in its flow direction $F_{va}$, but checked in its reverse-flow direction.

Thus, it will be appreciated that zipper manifold 30 as shown in FIG. 2, is set to divert flow through flow line 33c into its associated well head 19. Valve assemblies 31a and 31b are both in their shut-off condition, while valve assembly 31c is in its check condition. More specifically, pivot valves 40a and 40b in, respectively, flow lines 33a and 33b are all set to their check mode as indicated by the position of handles 53. Flow is shut off through flow lines 33a and 33b. Pivot valves 40c in flow line 33c, however, are set to their open mode. Fluid from distribution loop 32 is diverted into flow line 33c, for example, to fracture its associated well. Backflow from the fracturing operation, however, will be checked by flapper valves 60 in flow line 33c.

It will be appreciated that the novel zipper manifolds, such as zipper manifold 30, provide significant advantages over conventional zipper manifolds. Conventional zipper manifolds typically rely on gate valves to selectively divert fluid to wellhead flow lines. The combination of the novel pivot valves and flapper valves, as for example in valve assembly 30, provide selective diversion without many of the problems attendant to gate valves.

Pivot valves 40 may be quickly and easily moved between their check and open modes. Operation of conventional gate valves often takes some time. Moreover, the novel valves do not require grease and are far less prone to seizing. Maintenance is simplified, and issues created by grease being blown into the well are eliminated. The closure chamber also lacks areas where sand can build up and interfere with operation of the flapper. Conventional gate valves have a groove into which the gate of a gate valve must enter, and sand can build up in the groove, interfering with movement of the gate. To the extent that sand does settle in the novel valves, it also may be more easily flushed.

It will be appreciated that the novel zipper manifolds and flow lines may incorporate other conventional flowline components, such as pressure relief valves or bleed-off lines. They also may incorporate, for example, gauges and other monitoring equipment. Preferably, they also will incorporate ports allowing them to be flushed and cleaned out between operations. A flush-port assembly may be assembled to a tee junction 90 at a desired location. Though illustrated as incorporating a pair of pivot valves and a pair of flapper valves, that is not necessarily required. Many operators may prefer the increased reliability provided by redundant valves, but other operators may be satisfied with incorporating a single pivot valve and a single flapper valve to control flow through the well head flow lines. Likewise, while flapper valves 60 provide significant advantages over conventional flapper valves, conventional flapper valves may be used in combination with the novel pivot valves. Such valve assemblies also can be selectively placed in both shut-off and check conditions.

All or portions of the novel zipper manifolds may be mounted on a frame for easy transport to and from a site and to allow more rapid assembly and disassembly of a system. For example, one or more valve assemblies 31 may be mounted on a skid. Zipper manifold 30 also may be mounted on a rolling chassis, such as a trailer. The frames also may incorporate assemblers facilitating the make-up and breakdown of the components mounted on the frame.

Referring back to FIG. 2, as noted, frac manifold 30 comprises a number of novel tee fittings 90. Tee fitting 90a and tee fittings 90b in distribution loop 32 provide, respectively, an upstream connection to flow line flow line 14 leading from missile 13 of frac manifold 9 and downstream connections to flow lines 31 leading to well heads 19. Tee fittings 90c in flow lines 31 provide a downstream connection to well heads 19.

Figure 10:
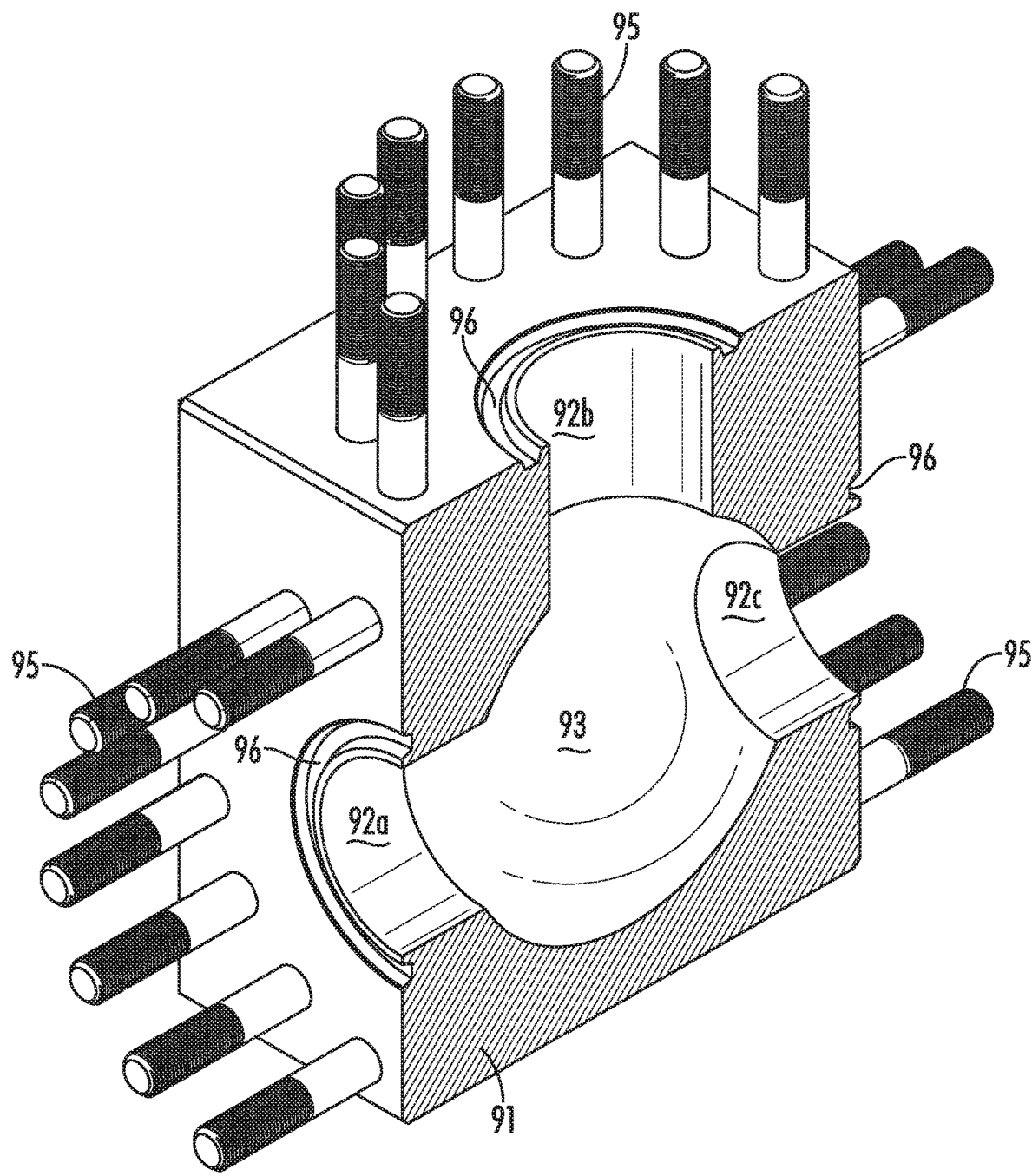
FIG. 10 is a cross-sectional, isometric view of tee fitting 90 shown in FIG. 9.
Figure 11:
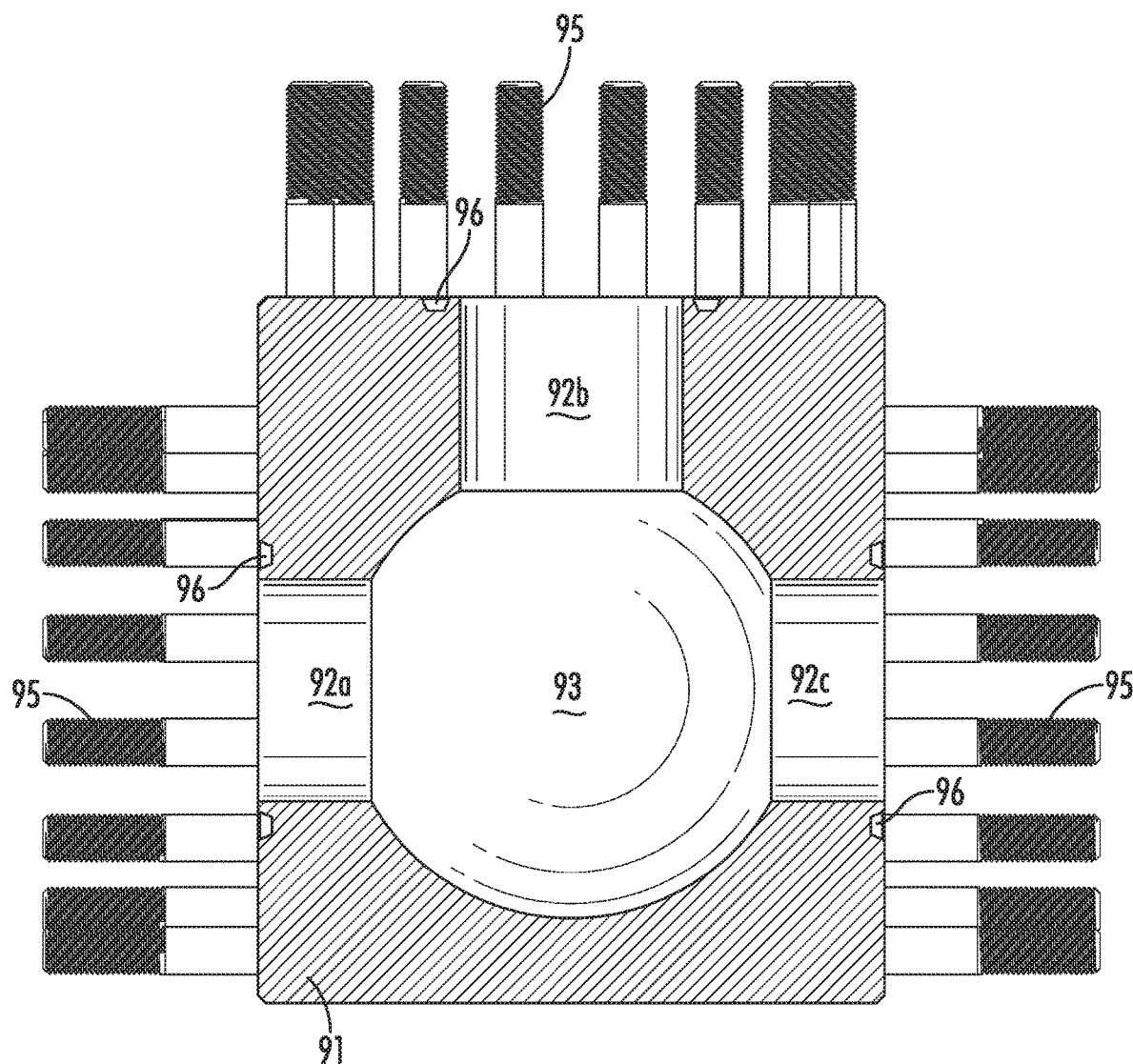
FIG. 11 is a cross-sectional view of tee fitting 90 shown in FIGS. 9-10.

As shown in greater detail in FIGS. 9-10, tee fitting 90 has a fitting body 91 defining three straight-line bores 92 and an interior plenum 93. Bores 92 extend into plenum 93 from flat surfaces or union faces 94 on the exterior of body 91. Bores 92a and bores 92c are aligned axially with each other, while bore 92b is perpendicular to bores 92a and 92c.

Referring to FIG. 2, tee fitting 90a splits flow into splitter pipe 36 and tee fittings 90b combine flow from distribution pipe 37. Bore 92b thus will experience larger flow volumes relative to bores 92a and 92c, and it may be provided with a somewhat larger diameter to enhance overall flow through, and to minimize pressure differentials across tee fittings 90.

Plenum 93 will help distribute flow more evenly when tee fitting 90 is used as a splitter fitting. More importantly, however, it is expected that plenum 90 will provide tee fitting 90 with better wear resistance and a longer service life than conventional tee fittings. That is, the slurry flowing through frac systems is highly abrasive and corrosive, moves at relatively high velocities under high pressure, and is quite turbulent in many areas. Consequently, flowline components tend to suffer material loss which can weaken the part and shorten its service life. The material loss results from a number of different dynamics, including ductile erosion and brittle erosion, both of which are exacerbated by corrosion.

Ductile erosion results from entrained sand and other particles dragging along the inner walls and cutting or ploughing into the walls. The angle of impingement typically is small, less than 30°. Ductile erosion is the primary dynamic in relatively straight sections of flow lines. Brittle erosion results from entrained sand impinging on the walls at or near normal to the surface, the impact causing tiny radial cracks in the wall. Brittle erosion is the primary dynamic in turbulent areas of a fitting, such as when the fitting provides a change of direction or splits or merges flow.

It also will be appreciated that corrosion generally tends to weaken material in the part. The part, therefore, is more susceptible to both ductile and brittle erosion. Moreover, since flowline components typically are manufactured from relatively hard steels, brittle erosion from near normal impacts caused by more turbulent flow typically plays a larger role than ductile erosion resulting from more laminar flow.

For example, turbulence and brittle erosion is the primary dynamic in the area where the three bores in a conventional tee fitting intersect, especially when the tee fitting is used as a splitter. Fluid entering the tee fitting directly impinges on the walls of the bores leading to the fitting outlets which may be only a few inches away. Plenum 93, however, creates a reduction in the velocity of fluid flowing from, for example, bore 92b to bores 92a and 92b. The reduction in velocity in turn reduces the kinetic energy of entrained particulates that scrape along or impinge on the walls of plenum 93 as fluid makes its way into bores 92a and 92c. Thus, it is expected that tee fitting 90 will experience less erosion during service.

While plenum 93 in tee fitting 90 may be visualized as generally spherical. More precisely, it is a truncated spherical segment, the sphere being truncated by bores 92. It may have other shapes, however, such as truncated ellipsoidal and other ovoidal shapes, solid obroundal shapes, tapered cylindrical, preferably providing smooth transitional walls into and out of the plenum. The sharp edges that otherwise would exist at the intersection of bores 92 are high stress areas. By significantly reducing such sharp edges, stress at the corners can be reduced significantly. Flow turbulence also is reduced, thus reducing erosion at the corners. The plenum also helps reduce vibration through the fitting and pressure drop across the fitting.

In general, such benefits will be increased as the size of the plenum relative to the bores is increased. Smaller plenums may not provide sufficient benefit to offset the additional effort required to produce the fitting, while at a certain point, the extra material cost of providing a larger plenum outweighs incremental benefits. Thus, the diameter of plenum 93, that is the diameter of the imaginary sphere coextensive with plenum 93, is at least approximately 150% of bore 92b, the bore leading into the split. For ovoidal and solid obroundal plenums, the minor diameter will be at least approximately 150% of the inlet bore. Preferably, those diameters will be from about 150% to about 250% of the inlets bore.

Such benefits also are of increasing value as flow through a fitting is required to make increasingly greater changes in direction. When there is only a modest change in direction, any benefits of the plenum may be offset by increased turbulence through the turn. In tee fitting 90, for example, fluid entering bore 92b will be required to make a 90° turn to enter either bore 92a or bore 92c. Other types of fittings also may create relatively sharp changes in flow direction and thus will benefit from incorporating a plenum. Such fittings generally will have bores that extend relative to each other at an interior angle of substantially greater than 0°, such as greater than about 30°, up to 90°. Thus, the novel fittings include, for example, elbow fittings, wye junctions, and cross junctions having a plenum where their bores intersect.

It also will be noted that tee fitting 90 is a block fitting. That is, body 91 has a generally polyhedral configuration, in this embodiment, a cubic configuration. As compared to the tubular configuration of many conventional tee fittings, polyhedral bodies, such as solid rectangular, cubic, and other prismatic bodies, are greatly preferred.

For example, polyhedral bodies can easily be manufactured to provide tee fitting 90 with additional thickness in conduit walls. Preferably the minimum width of body 91, as a ratio to the diameter of the bores, is at least about 3:2, and more preferably at least about 2:1 or 3:1. Body 91 of tee junction 90 has a generally square cross section, so its minimum width is the distance between opposing sides of body 91. As illustrated, the minimum width of body 91 is about 3 times as great as the diameter of bores 92. Thus, tee fitting 90 should be able to tolerate more erosion before reaching a point where the integrity of the fitting is compromised.

Perhaps more importantly, polyhedral bodies may be more easily provided with plenums and flange union faces. As discussed above, a plenum reduces erosion through the fitting and extends its service life. Flange unions also are less prone to leaking. They do not rely on elastomeric seals that are exposed to flow, and that may leak and tend to create turbulence through the union. They have internal metal seals situated between the union faces.

As appreciated from FIG. 9, union faces 94 are provided with, for example, 16 threaded studs 95 threaded or otherwise fitted into bottomed holes in body 91. Alternately, the holes in body 91 may be threaded to accept standing bolts or other threaded connectors. Studs 95 are arranged angularly about bore 92. When provided with studs or other threaded connectors, mating components, such as spools 34 may be joined to tee fitting 90 by a flange-type union. More or fewer studs 95 and connectors may be provided depending upon the size of the union between the components and the pressures for which the union will be rated.

Typically, union faces 94 will be provided with a metal seal (not shown). The seal is disposed in a groove, such as annular groove 96 running around the openings of bores 92. A seal is generally required to avoid leakage at union faces 94. Preferably, weep ports (not shown) are provided in tee fittings 90. Weep ports are relatively small passageways extending angularly through body 91 of tee fitting 90. They extend from seal grooves 96 in union faces 94 to the outer surface of tee fitting 90. If there is any leakage around the metal seal and union faces 94, it may be more easily detected by monitoring the weep port for any discharge of fluid. Weep ports may have other configurations than a single passageway leading from seal grooves 96, such as intersecting bores. In any event, weep ports may allow a relatively minor leak to be addressed before developing into a more serious situation.

Also, and though described as "flat" herein, union faces 94 typically will have a slightly elevated, annular boss running around the openings of bore 92. The annular boss will help ensure that the abutment between mating union faces is properly loaded when the union is made up. The designs and features of union faces in particular and flange unions in general are well known, however, and the union faces on tee fitting 90 and the other components disclosed herein may be varied in accordance with common practice in the art.

As with novel valves 40 and 60, however, the novel tee fittings may be fabricated so that they may be joined by other types of unions. For example, flanged hammer union or clamp union subs may be joined to a block fitting by a flange union, allowing additional components to be joined by a hammer union or a clamp union. A hammer union sub or a clamp union sub also may be provided integrally on the novel fittings if desired.

The flowline components of the subject invention may be manufactured by methods and from materials commonly used in manufacturing flow iron components. Given the extreme stress and the corrosive and abrasive fluids to which flowline components are exposed, especially those designed for high-pressure, high-velocity flow lines, suitable materials will be hard and strong. For example, the novel components, except for their seals, may be manufactured from 4130 and 4140 chromoly steel or from somewhat harder, stronger steel such as 4130M7, high end nickel alloys, and stainless steel. The components may be made by any number of conventional techniques, but typically and in large part will be made by forging, extruding, or mold casting a blank part and then machining the required features into the part. Conventional components of the novel flow lines are widely available from a number of manufacturers.

The novel components also will incorporate various features of conventional high-pressure flowline components. For example, the novel valves and fittings are quite heavy and, therefore, preferably incorporate components which make it easier to handle and manipulate the valve, such as lifting eyes. Other conventional features, however, may be incorporated into the novel components as will be readily appreciated by workers in the art having the benefit of this disclosure.

Similarly, the novel components have been described in the context of frac systems. While frac systems in particular and the oil and gas industry in general rely on valves and fittings, especially in high-pressure applications, the novel components are not limited to such applications or industries. Likewise, they are not limited in their application to the specific, exemplified flow lines, zipper manifold, or frac systems, or to the mentioned pressure ratings. Suffice it to say that the novel components have wide applicability wherever flapper valves and fittings have been conventionally applied.

It also will be appreciated that the terms such as "upper," "lower," "inner," "outer," "horizontal," "vertical," and the like are made with reference to the orientation in which the novel valves generally will be when they are assembled into a flowline, for example, as illustrated in FIGS. 2-3. The novel valves necessarily will be installed with the central passage running substantially horizontally if the flapper is to operate as intended.

While this invention has been disclosed and discussed primarily in terms of specific embodiments thereof, it is not intended to be limited thereto. Other modifications and embodiments will be apparent to the worker in the art.

What is claimed is:

1. A system for fracturing a well, said system comprising:
   (a) a flow line adapted to convey frac fluid discharged from one or more high-pressure pumps to a well head; and
   (b) a flapper valve mounted in said flow line and adapted to control flow through said flow line, said flapper valve comprising:
      i) a valve housing adapted for assembly into said flow line;
      ii) a passage in said housing providing a valve inlet and a valve outlet;
      iii) a valve seat in said passage;
      iv) a flapper, said flapper mounted for pivoting freely through a flapper chamber in said passage, whereby said flapper is adapted to pivot away from said seat in response to flow through said passage in a flapper valve flow direction and to bear on said seat in response to flow through said passage in a flapper valve reverse-flow direction, whereby said flapper allows flow through said passage in said flapper valve flow direction and checks flow through said passage in said flapper valve reverse-flow direction; and
      v) a hydrofoil extending from said flapper.

2. The system of claim 1, wherein said hydrofoil comprises a strut extending axially from said flapper and a wing mounted on said strut and extending substantially parallel to said flapper, wherein the surfaces of said wing are shaped to provide lift to said flapper when fluid flows through said valve in said flow direction.

3. The system of claim 1, wherein said flapper valve comprises a blind chamber leading from said flapper chamber and wherein said hydrofoil lifts said flapper into said blind chamber when fluid flows through said valve in said flow direction.

4. The system of claim 3, wherein said housing comprises a service port and a cap removably covering said port, said port and cap defining said blind chamber.

5. The system of claim 1, wherein said housing has a union face at said inlet adapted for connection to a flowline component by a flange union and a union face at said outlet adapted for connection to a flowline component by a flange union.

6. The system of claim 1, wherein said valve seat is provided on an insert removably mounted in said housing.

7. The system of claim 1, wherein said system comprises a valve assembly mounted in said flow line and having a check condition allowing flow in an assembly flow direction and a shut-off condition shutting off flow in both said assembly flow direction and an assembly reverse-flow direction, said valve assembly comprising:
   (a) said flapper valve; and
   (b) a pivot valve mounted in said flow line, said pivot valve comprising:
      i) a pivot valve housing adapted for assembly into said flow line;
      ii) a passage in said pivot valve housing providing a pivot valve inlet and a pivot valve outlet;
      iii) a valve seat in said passage; and
      iv) a pivot valve closure, said closure being mounted for pivoting movement through a closure chamber in said passage;
      v) wherein said pivot valve may be selectively set in a check mode and an open mode; wherein
         (1) said closure in said check mode can pivot freely through said closure chamber, whereby said closure is adapted to pivot away from said seat in response to flow through said passage in a pivot valve flow direction and to bear on said seat in response to flow through said passage in a pivot valve reverse-flow direction, whereby said closure allows flow through said passage in said pivot valve flow direction and checks flow through said passage in said pivot valve reverse-flow direction;
         (2) said closure in said open mode is supported substantially above flow through said passage to allow flow in said pivot valve reverse-flow direction;
   (c) wherein the flapper valve is oriented such that the flapper valve flow direction is the same as the assembly flow direction and the pivot valve is oriented such that the pivot valve flow direction is the same as the assembly reverse-flow direction;
(d) whereby said valve assembly:
  i) may be set in its said check condition by setting said pivot valve in its open mode; and
  ii) may be set in its said shut-off condition by setting said pivot valve in its check mode.

8. The system of claim 7, wherein said system comprises a zipper manifold adapted to selectively control flow into a plurality of wells, said zipper manifold comprising:
   (a) a distribution pipe adapted to receive said flow into said zipper manifold;
   (b) a first and a second of said valve assemblies;
   (c) said first valve assembly being assembled in a first flow line running from said distribution pipe to a first well; and
   (d) said second valve assembly being assembled in a second flow line running from said distribution pipe to a second well;
   (e) whereby said flow may be selectively diverted from said distribution pipe into said first well or said second well by selectively setting said first and second valve assemblies in their check condition or shut-off condition.

9. The system of claim 7, wherein said assembly comprises a pair of said flapper valves and a pair of said pivot valves.

10. The system of claim 7, wherein said assembly is mounted on a frame.

11. The system of claim 1, wherein said hydrofoil is positioned away from an upstream face of said flapper a distance sufficient such that, when said flapper pivots away from said seat in response to said flow through said passage in said flapper valve flow direction, said upstream face of said flapper is supported above the main stream of said flow in said flapper valve flow direction.

12. A system for fracturing a well, said system comprising:
   (a) a flow line adapted to convey frac fluid discharged from one or more high-pressure pumps to a well head; and
   (b) a valve assembly mounted in said flow line and having a check condition allowing flow in an assembly flow direction and a shut-off condition shutting off flow in both said assembly flow direction and an assembly reverse-flow direction, said valve assembly comprising:
      i) a flapper valve, said flapper valve comprising:
         (1) a valve housing adapted for assembly into said flow line;
         (2) a passage in said housing providing a valve inlet and a valve outlet;
         (3) a valve seat in said passage;
         (4) a flapper, said flapper mounted for pivoting freely through a flapper chamber in said passage, whereby said flapper is adapted to pivot away from said seat in response to flow through said passage in a flapper valve flow direction and to bear on said seat in response to flow through said passage in a flapper valve reverse-flow direction, whereby said flapper allows flow through said passage in said flapper valve flow direction and checks flow through said passage in said flapper valve reverse-flow direction; and
      ii) a pivot valve, said pivot valve comprising:
         (1) a pivot valve housing adapted for assembly into said flow line;
         (2) a passage in said pivot valve housing providing a pivot valve inlet and a pivot valve outlet;
         (3) a valve seat in said passage; and
         (4) a pivot valve closure, said closure being mounted for pivoting movement through a closure chamber in said passage;
         (5) wherein said pivot valve may be selectively set in a check mode and an open mode; wherein
            (a) said closure in said check mode can pivot freely through said closure chamber, whereby said closure is adapted to pivot away from said seat in response to flow through said passage in a pivot valve flow direction and to bear on said seat in response to flow through said passage in a pivot valve reverse-flow direction, whereby said closure allows flow through said passage in said pivot valve flow direction and checks flow through said passage in said pivot valve reverse-flow direction;
            (b) said closure in said open mode is supported substantially above flow through said passage to allow flow in said pivot valve reverse-flow direction;
      iii) wherein the flapper valve is oriented such that the flapper valve flow direction is the same as the assembly flow direction and the pivot valve is oriented such that the pivot valve flow direction is the same as the assembly reverse-flow direction;
      iv) whereby said valve assembly:
         (1) may be set in its said check condition by setting said pivot valve in its open mode; and
         (2) may be set in its said shut-off condition by setting said pivot valve in its check mode.

* * * * *